United States Patent
Suzuki et al.

(10) Patent No.: US 12,130,635 B2
(45) Date of Patent: Oct. 29, 2024

(54) INFORMATION PROCESSING SYSTEM AND INFORMATION PROCESSING APPARATUS

(71) Applicant: SONY GROUP CORPORATION, Tokyo (JP)

(72) Inventors: Kento Suzuki, Tokyo (JP); Tomoyuki Suzuka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 234 days.

(21) Appl. No.: 17/753,539

(22) PCT Filed: Aug. 7, 2020

(86) PCT No.: PCT/JP2020/030497
§ 371 (c)(1),
(2) Date: Mar. 7, 2022

(87) PCT Pub. No.: WO2021/049227
PCT Pub. Date: Mar. 18, 2021

(65) Prior Publication Data
US 2022/0334594 A1 Oct. 20, 2022

(30) Foreign Application Priority Data
Sep. 13, 2019 (JP) .................. 2019-167146

(51) Int. Cl.
*G05D 1/00* (2024.01)
*G01S 5/00* (2006.01)

(52) U.S. Cl.
CPC .......... *G05D 1/0289* (2013.01); *G01S 5/0072* (2013.01); *G05D 1/0219* (2013.01)

(58) Field of Classification Search
None
See application file for complete search history.

(56) References Cited

U.S. PATENT DOCUMENTS

| | | | |
|---|---|---|---|
| 2005/0126833 A1* | 6/2005 | Takenaka | B25J 13/088 180/8.1 |
| 2007/0247368 A1* | 10/2007 | Wu | G01S 5/0289 342/465 |

(Continued)

FOREIGN PATENT DOCUMENTS

| | | |
|---|---|---|
| CN | 102016625 A | 4/2011 |
| JP | 2009-264844 A | 11/2009 |

(Continued)

OTHER PUBLICATIONS

Fankhauser et al. Collaborative navigation for flying and walking robots Oct. 2016 DOI:10.1109/IROS.2016.7759443 Conference: 2016 IEEE/RSJ International Conference on Intelligent Robots and Systems (IROS) available online @ https://www.researchgate.net/publication/312323082. 9 pages (Year: 2016).*

(Continued)

*Primary Examiner* — Daniel L Greene
(74) *Attorney, Agent, or Firm* — CHIP LAW GROUP

(57) ABSTRACT

Provided is an information processing system that includes a first information processing apparatus that estimates a self-position of a first mobile body, and a second information processing apparatus that estimates a self-position of a second mobile body. The first information processing apparatus includes a movement control unit that performs control for moving, based on observation target information indicating a probability of the first mobile body being observed from the second mobile body, the first mobile body to a position where the second mobile body is capable of observing the first mobile body, an acquiring unit that acquires correction information capable of specifying relative positions of the first mobile body and the second mobile body from the second mobile body that has observed the first mobile body, and a correcting unit that corrects the self- (Continued)

position of the first mobile body based on the correction information.

14 Claims, 19 Drawing Sheets

(56) References Cited

U.S. PATENT DOCUMENTS

| | | | |
|---|---|---|---|
| 2008/0108371 A1* | 5/2008 | Alizadeh-Shabdiz | ..................... H04W 24/02 342/357.29 |
| 2010/0017046 A1* | 1/2010 | Cheung | ................ G05D 1/0038 701/2 |
| 2011/0037647 A1 | 2/2011 | Tajima et al. | |
| 2012/0122486 A1* | 5/2012 | Day | ..................... G05D 1/0274 455/456.1 |
| 2015/0301189 A1* | 10/2015 | Berchin | ................ G01S 19/072 342/357.23 |
| 2016/0174034 A1* | 6/2016 | Gao | ..................... H04W 4/027 455/456.2 |
| 2017/0097232 A1* | 4/2017 | Anderson-Sprecher | ..................... B25J 5/007 |
| 2017/0328683 A1* | 11/2017 | Smith | ................... G01S 5/0072 |
| 2018/0131856 A1* | 5/2018 | Sato | ..................... G05D 1/0231 |
| 2019/0353794 A1* | 11/2019 | Hiroi | ..................... B64C 39/024 |
| 2021/0263533 A1* | 8/2021 | Motoyama | ............. G06V 20/58 |

FOREIGN PATENT DOCUMENTS

| | | |
|---|---|---|
| JP | 2010-055415 A | 3/2010 |
| JP | 2011-170762 A | 9/2011 |
| JP | 2014-203146 A | 10/2014 |
| JP | 2018-185596 A | 11/2018 |
| WO | 2009/130570 A2 | 10/2009 |

OTHER PUBLICATIONS

A. Dias, J. Almeida, E. Silva and P. Lima, "Multi-robot cooperative stereo for outdoor scenarios," 2013 13th International Conference on Autonomous Robot Systems, Lisbon, Portugal, 2013, pp. 1-6, doi: 10.1109/Robotica.2013.6623531. (Year: 2013).*

International Search Report and Written Opinion of PCT Application No. PCT/JP2020/030497, issued on Nov. 10, 2020, 09 pages of ISRWO.

* cited by examiner

INFORMATION PROCESSING SYSTEM AND INFORMATION PROCESSING APPARATUS

CROSS REFERENCE TO RELATED APPLICATIONS

This application is a U.S. National Phase of International Patent Application No. PCT/JP2020/030497 filed on Aug. 7, 2020, which claims priority benefit of Japanese Patent Application No. JP 2019-167146 filed in the Japan Patent Office on Sep. 13, 2019. Each of the above-referenced applications is hereby incorporated herein by reference in its entirety.

FIELD

The present disclosure relates to an information processing system, an information processing apparatus, and an information processing program.

BACKGROUND

As a technology related to a mobile body such as an automobile and a robot, a technology called simultaneous localization and mapping (SLAM) in which a mobile body performs map creation of the surroundings and self-position estimation has been developed. In addition, Patent Literature 1 discloses a technique of guiding a work robot to a work point using a measurement robot, the work robot, and a remote control device capable of remotely controlling the robots from the outside of a work area.

CITATION LIST

Patent Literature

Patent Literature 1: JP 2014-203146 A

SUMMARY

Technical Problem

In the prior art, there is a possibility that an error occurs in an estimated self-position according to the movement of the mobile body. In addition, in Patent Literature 1, even if the measurement robot is used or the position of the work robot is detected, an error may occur in the position. For this reason, in the related art, it is desired to correct an error generated at a self-position of a mobile body without using a device other than the mobile body in an environment where a plurality of mobile bodies operate.

Therefore, the present disclosure provides an information processing system, an information processing apparatus, and an information processing program that enable information processing apparatuses mounted on a plurality of mobile bodies to support correction of self-positions of the other mobile bodies.

Solution to Problem

To solve the problems described above, an information processing system according to an embodiment of the present disclosure includes: a first information processing apparatus that estimates a self-position of a first mobile body; and a second information processing apparatus that estimates a self-position of a second mobile body, wherein the first information processing apparatus includes: a movement control unit that performs control for moving, based on observation target information indicating a probability of the first mobile body being observed from the second mobile body, the first mobile body to a position where the second mobile body is capable of observing the first mobile body; an acquiring unit that acquires correction information capable of specifying relative positions of the first mobile body and the second mobile body from the second mobile body that has observed the first mobile body; and a correcting unit that corrects the self-position of the first mobile body based on the correction information, and the second information processing apparatus includes: an observing unit that observes the first mobile body around the second mobile body; and a providing unit that provides the correction information capable of specifying relative positions of the observed first mobile body and the second mobile body to the first information processing apparatus of the first mobile body.

To solve the problems described above, an information processing apparatus according to an embodiment of the present disclosure includes: an estimating unit that estimates a self-position of a first mobile body on which an own apparatus is mounted; a movement control unit that performs control for moving, based on observation target information indicating a probability of the first mobile body being observed from a second mobile body, the first mobile body to a position where the second mobile body is capable of observing the first mobile body; an acquiring unit that acquires correction information capable of specifying relative positions of the first mobile body and the second mobile body from the second mobile body that has observed the first mobile body; and a correcting unit that corrects the self-position of the first mobile body based on the correction information.

To solve the problems described above, an information processing apparatus according to an embodiment of the present disclosure includes: an estimating unit that estimates a self-position of a first mobile body on which an own apparatus is mounted; a movement control unit that performs control for moving, based on observation target information indicating a probability of the first mobile body being observed from a second mobile body, the first mobile body to a position where the second mobile body is capable of observing the first mobile body; an acquiring unit that acquires correction information capable of specifying relative positions of the first mobile body and the second mobile body from the second mobile body that has observed the first mobile body; and a correcting unit that corrects the self-position of the first mobile body based on the correction information.

To solve the problems described above, an information processing program according to an embodiment of the present disclosure causes a computer to realize: estimating a self-position of a first mobile body on which an own apparatus is mounted; performing control for moving, based on observation target information indicating a probability of the first mobile body being observed from a second mobile body, the first mobile body to a position where the second mobile body is capable of observing the first mobile body; acquiring correction information capable of specifying relative positions of the first mobile body and the second mobile body from the second mobile body that has observed the first mobile body; and correcting the self-position of the first mobile body based on the correction information.

To solve the problems described above, an information processing program according to an embodiment of the present disclosure causes a computer to realize: estimating a self-position of a second mobile body on which an own apparatus is mounted; observing a first mobile body around the second mobile body; and providing correction information capable of specifying relative positions of the observed first mobile body and the second mobile body to a first information processing apparatus of the first mobile body.

DESCRIPTION OF EMBODIMENTS

Figure 1:
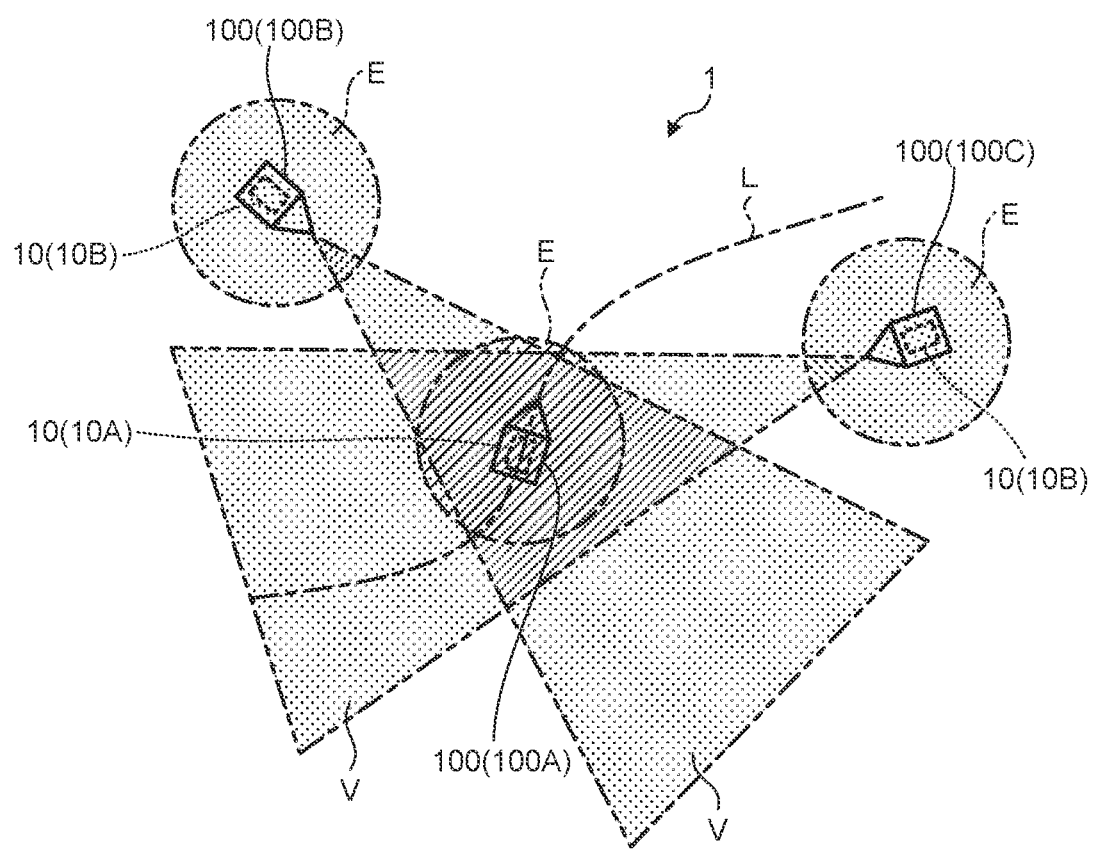
FIG. 1 is an explanatory diagram for explaining an example of the information processing system according to an embodiment.

An embodiment of the present disclosure is explained in detail below based on the drawings. Note that, in the embodiment explained below, redundant explanation is omitted by denoting the same parts with the same reference numerals and signs.

EMBODIMENT

[Overview of an Information Processing System According to an Embodiment]

FIG. 1 is a diagram for explaining an example of an information processing system according to an embodiment. An information processing system 1 illustrated in FIG. 1 includes a plurality of information processing apparatuses 10. Each of the plurality of information processing apparatuses 10 is mounted on each of a plurality of mobile bodies 100. In other words, the information processing system 1 includes the plurality of mobile bodies 100 on which the information processing apparatuses 10 are mounted.

The mobile body 100 is, for example, a mobile body capable of autonomously moving. The mobile body 100 includes, for example, a robot, a vehicle (a motorcycle, an automobile, and a bicycle), a bogie, a ship, a flying object (an airplane and an unmanned aerial vehicle (UAV)), and a drone. The mobile body 100 is a mobile body driven according to operation by a human or a mobile body capable of automatically moving (autonomously moving) not via operation by a human. The mobile body 100 capable of autonomously moving is, for example, an automatic driving vehicle or an autonomous driving robot. A case in which the mobile body 100 in the present embodiment is an autonomously drivable robot is explained as an example.

The mobile body 100 includes the information processing apparatus 10. The information processing apparatus 10 is, for example, a dedicated or general-purpose computer. The information processing apparatus 10 is, for example, a dedicated or general-purpose computer. The information processing apparatus 10 has a function of estimating a self-position based on a detection result of a sensor unit, a movement result of the mobile body 100, and the like. The self-position means, for example, the position of the information processing apparatus 10 and the mobile body 100 on which the information processing apparatus 10 is mounted. The information processing apparatus 10 further has a function of planning a route of the mobile body 100, a function of re-planning the route, a function of controlling movement of the mobile body 100 to move along the route, and the like.

In the example illustrated in FIG. 1, the information processing system 1 includes three information processing apparatuses 10. When an error occurs in a self-position of a mobile body 100A, the information processing system 1 includes one information processing apparatus 10A and two information processing apparatuses 10B. The information processing apparatus 10A is an apparatus mounted on the mobile body 100A that needs correction of an estimated self-position. That is, the information processing apparatus 10A is an example of a first information processing apparatus that needs correction of a self-position. In this case, the mobile body 100A is equivalent to a first mobile body.

Furthermore, the information processing apparatuses 10B are apparatuses mounted on a mobile body 100B and a mobile body 100C that do not need correction of self-positions and support correction of self-positions of other mobile bodies. That is, the information processing apparatus 10B is an example of a second information processing apparatus that does not need correction of a self-position. In this case, the mobile body 100B and the mobile body 100C are equivalent to a second mobile body.

The mobile body 100A, the mobile body 100B, and the mobile body 100C are mobile bodies movable on the inside of a region E for a predetermined time. The mobile body 100B has a configuration capable of observing an observation region V at certain time. The observation region V may be, for example, a part of the periphery such as the front of the mobile body 100 or may be the entire periphery. The example illustrated in FIG. 1 is based on a premise that an error occurs in a self-position of the mobile body 100A but no error occurs in self-positions of the mobile body 100B and the mobile body 100C.

Note that, in the following description, the information processing apparatus 10A and the information processing apparatus 10B are sometimes explained as information processing apparatus 10 when the information processing apparatus 10A and the information processing apparatus 10B are not distinguished. Furthermore, the mobile body 100 on which the information processing apparatus 10 is mounted is sometimes explained as "own vehicle" and the information processing apparatus 10 is sometimes explained as "own apparatus".

The information processing apparatus 10 has a function of correcting the estimated self-position of the mobile body 100 based on an observation result of another mobile body 100. For example, when determining that the estimated self-position of the mobile body 100A is invalid, the information processing apparatus 10A moves the mobile body 100A to cause the other mobile bodies 100B, 100C, and the like around the mobile body 100A to observe the mobile body 100A. Then, the information processing apparatus 10A corrects the self-position based on the observation results of the other mobile bodies 100B, 100C, and the like. For example, the information processing apparatus 10A corrects the self-position of the mobile body 100A based on a positional relation between the mobile body 100A and the mobile body 100B observed by the other information processing apparatus 10B.

For example, in an environment in which a plurality of mobile bodies 100 of an autonomous mobile type coexist, each of the plurality of mobile bodies 100 moves along a route while executing an individually set moving task. In the related art, since it is necessary to provide dedicated instrument, equipment, or the like that always observes the plurality of mobile bodies 100, it has been desired to simplify a system configuration. In the present disclosure, the self-position can be corrected only by the plurality of mobile bodies 100 without complicating the configuration and environment of the system.

[Configuration Example of the Mobile Body According to the Embodiment]

Figure 2:
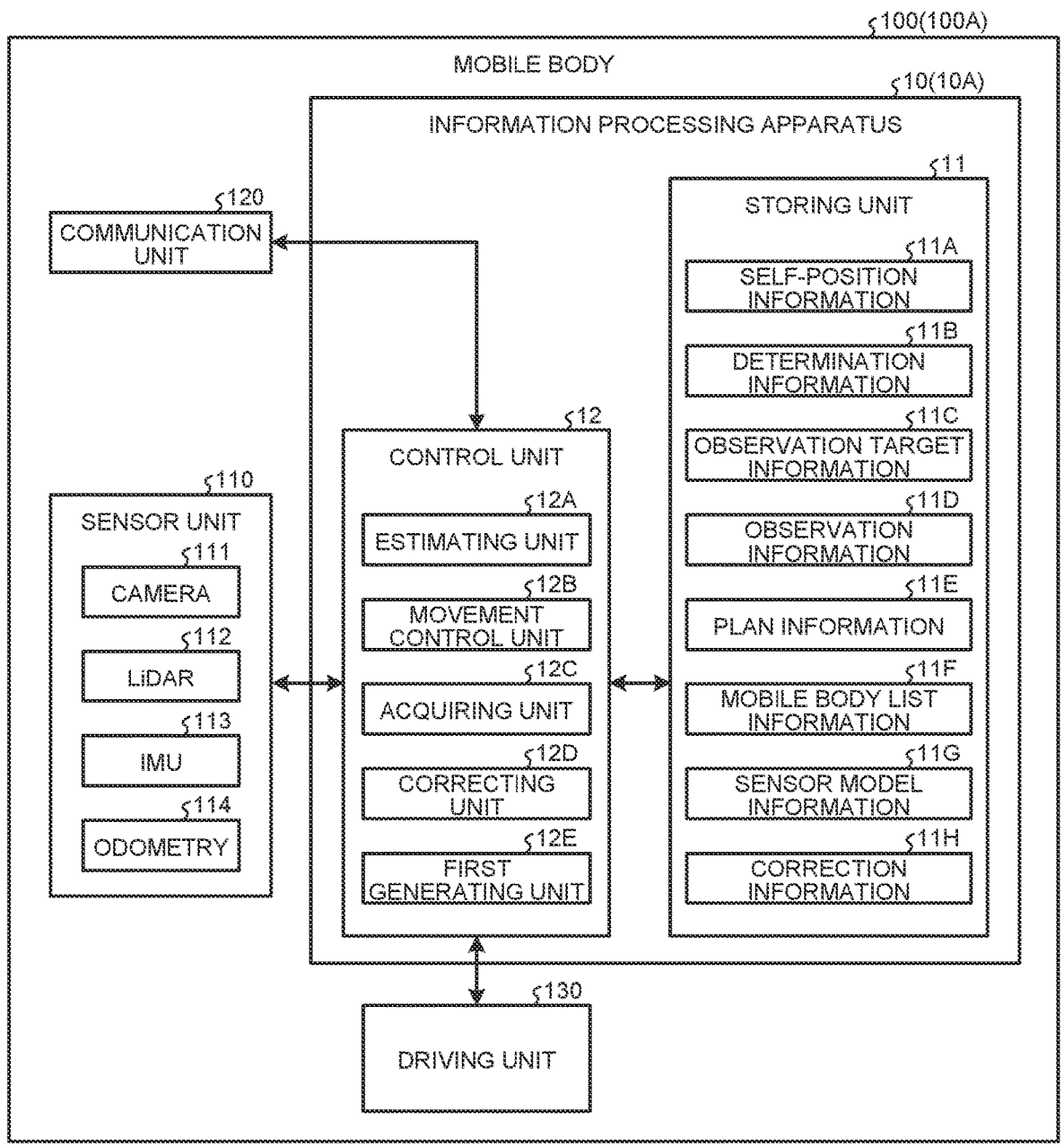
FIG. 2 is a diagram for explaining an example of a mobile body on an observed side and an information processing apparatus according to the embodiment.

FIG. 2 is a diagram for explaining an example of the mobile body 100A and the information processing apparatus 10A on an observed side according to the embodiment.

As illustrated in FIG. 2, the mobile body 100 (100A) includes a sensor unit 110, a communication unit 120, a driving unit 130, and an information processing apparatus 10 (10A). The sensor unit 110, the communication unit 120, the driving unit 130, and the information processing apparatus 10A are connected to be capable of exchanging data and signals.

The sensor unit 110 includes various sensors that detect sensor data used for processing of the mobile body 100 and supplies the detected sensor data to the information processing apparatus 10 and the like. In the present embodiment, the sensor unit 110 includes, for example, a camera 111, a light detection and ranging (laser imaging detection and ranging (LiDAR)) 112, an inertial measurement unit (IMU) 113, and odometry 114.

The camera 111 simultaneously senses an image around the own vehicle and distance information. In the present embodiment, a case where the camera 111 is a depth camera is explained, but the camera may include other cameras such as a time of flight (ToF) camera, a stereo camera, a monocular camera, and an infrared camera. The camera 111 may be, for example, a combination of a plurality of types of cameras. The camera 111 supplies captured image data to the information processing apparatus 10 and the like. The image data includes items such as time, a frequency, an image, and depth information. In the item of the time, time when the data is generated is set. In the item of the frequency, an output function of depth information is set. In the item of the image, a two-dimensional RGB image is set. In the item of the depth information, depth information of an image is set. The depth information may be output in a point group format.

The LiDAR 112 senses two-dimensional/three-dimensional point group distance data around the own vehicle. The LiDAR 112 supplies the point group distance data to the information processing apparatus 10 and the like. The point group distance data includes items such as time, a frequency, and point Cloud. In the item of the time, time when the data is generated is set. In the item of the frequency, an output frequency of the point Cloud is set. As the item of the point group, a two-dimensional/three-dimensional point group (coordinates of each point) and a generation time of each point are set.

The IMU 113 detects angles, accelerations, and the like of three axes that govern the operation of the mobile body 100. The IMU 113 includes various sensors such as an acceleration sensor, a gyro sensor, and a magnetic sensor. The IMU 113 supplies state data of the mobile body 100 to the information processing apparatus 10 and the like. The state data includes items such as time, a frequency, a direction, angular velocity, and acceleration. In the item of the time, time when the data is generated is set. In the item of the frequency, an output frequency of the IMU is set. In the items of the direction, the angular velocity, and the acceleration, values obtained by detecting a direction, angular velocity, and acceleration are set.

The odometry 114 estimates a movement amount and a speed at which the mobile body 100 actually moves. For example, when the mobile body 100 moves on wheels, the odometry 114 measures and accumulates a rotation amount of the wheels or the like to estimate a movement amount of the own vehicle. In addition, the odometry 114 may estimate the movement amount of the own vehicle from a temporal change amount of a feature value in a camera image. The odometry 114 supplies movement data of the mobile body 100 to the information processing apparatus 10 and the like. The movement data includes, for example, items such as time, a posture, and speed. In the item of the time, time when the data is generated is set. In the item of the posture, a position, a direction, and the like indicating the posture of the mobile body 100 in an origin coordinate of a track are set.

The sensor unit 110 may detect a position using, for example, global positioning system (GPS) map matching, WiFi (registered trademark) positioning, magnetic positioning, Bluetooth (registered trademark) low energy (BLE) positioning, beacon positioning, or the like.

The communication unit 120 communicates with the mobile body 100 and another mobile body 100 and various electronic devices, information processing servers, base stations, and the like on the outside. The communication unit 120 outputs data received from another information processing apparatus 10, an information processing server, or the like to the information processing apparatus 10 and transmits data from the information processing apparatus 10 to the other information processing apparatus 10, the information processing server, or the like. Note that the communication protocol supported by the communication unit 120 is not particularly limited. The communication unit 120 can support a plurality of types of communication protocols.

The driving unit 130 drives a moving mechanism that moves the mobile body 100. The moving mechanism includes a mechanism for driving wheels, legs, propellers, and the like. The driving unit 130 drives the moving mechanism according to an operation command or the like output from the information processing apparatus 10. As a result, the mobile body 100 is moved by driving of the moving function.

[Configuration Example of the Information Processing Apparatus on the Observed Side]

The information processing apparatus 10A is, for example, a dedicated or general-purpose computer mounted on the mobile body 100A on the observed side. The information processing apparatus 10A includes a storing unit 11 and a control unit 12. The storing unit 11 and the control unit 12 are connected to be capable of exchanging data and information. In the following explanation, the information processing apparatus 10A is sometimes explained as an "observed apparatus".

The storing unit 11 stores various data and programs. The storing unit 11 is realized by, for example, a semiconductor memory element such as a RAM or a flash memory or a storage device such as a hard disk or an optical disk. Note that the storing unit 11 may be provided on the outside of the mobile body 100. Specifically, the storing unit 11 may be provided in a Cloud server connected to the information processing apparatus 10A via a network.

The storing unit 11 stores information such as self-position information 11A, determination information 11B, observation target information 11C, observation information 11D, plan information 11E, mobile body list information 11F, sensor model information 11G, and correction information 11H.

The self-position information 11A includes, for example, information indicating the self-position of the mobile body 100 in time series. The determination information 11B includes information indicating a condition for determining the validity of the self-position. The observation target information 11C includes information indicating a probability of the mobile body 100 having a certain posture being observed from the peripheral mobile body 100 at certain time. The peripheral mobile body 100 includes, for example, a predetermined range centered on the own vehicle. The observation target information 11C includes a probability of being observed map represented as a probability field of a moving point where the own vehicle is observed from the peripheral mobile body 100. An example of the probability of being observed map is explained below. The observation information 11D includes information indicating a probability of the mobile body 100 in a certain position being able to observe the peripheral mobile body 100 at certain time. The observation information 11D includes an observation probability map indicating a probability of the own vehicle observing the peripheral mobile body 100. An example of the observation probability map is explained below.

The plan information 11E includes information indicating routes L, movement plans, and the like of the plurality of mobile bodies 100. The movement plan includes, for example, time of movement in a certain position, and speed and a posture of the mobile body 100 in the certain position. The plan information 11E includes, for example, information indicating a route L and a movement plan for each of the plurality of information processing apparatuses 10 (mobile bodies 100) included in the information processing system 1. The mobile body list information 11F includes information indicating a list of mobile bodies 100 on which the information processing apparatuses 10 included in the information processing system 1 are mounted. For example, the mobile body list information 11F includes identification information or the like for managing the mobile body 100.

The sensor model information 11G includes information of a sensor model of the mobile body 100 on which the information processing apparatus 10 included in the information processing system 1 is mounted. For example, the sensor model information 11G includes information such as a range, a direction, and specifications that can be observed by the sensor unit 110 of the mobile body 100. The correction information 11H includes information acquired from the mobile body 100 on the observing side and capable of specifying relative positions of the mobile body 100 on the observed side and the mobile body 100 on the observing side. The relative positions means positional relations such as a direction of the mobile body 100 and a distance between the plurality of mobile bodies 100. The correction information 11H may be erased according to an end of correction of a self-position.

Note that not all of the plan information 11E, the mobile body list information 11F, and the sensor model information 11G need to be stored in the storing unit 11. The plan information 11E, the mobile body list information 11F, and the sensor model information 11G may be stored in, for example, an information processing server, a storage device, or the like accessible by the information processing apparatus 10.

The control unit 12 includes functional units such as an estimating unit 12A, a movement control unit 12B, an acquiring unit 12C, a correcting unit 12D, and a first generating unit 12E. The functional units of the control unit 12 is realized by, for example, a central processing unit (CPU), a micro control unit (MCU), or the like executing a program stored inside the information processing apparatus 10 using a random access memory (RAM) or the like as a work area. Furthermore, the functional units may bae realized by, for example, an integrated circuit such as an application specific integrated circuit (ASIC) or a field-programmable gate array (FPGA).

The estimating unit 12A estimates a self-position of the mobile body 100 based on data from the sensor unit 110. The estimating unit 12A estimates a self-position including, for example, a position and a posture of the mobile body 100. The posture of the mobile body 100 includes, for example, a direction (traveling direction) and a pose of the mobile body 100. The estimating unit 12A may estimate the self-position based on, for example, information acquired from the outside of the mobile body 100. For example, the estimating unit 12A may estimate the self-position using a highly accurate map obtained by using a technique such as SLAM. The estimating unit 12A estimates a self-position (a current position) of the mobile body 100 in a specific coordinate system and stores the self-position in the storing unit 11 as self-position information 11A including the self-position.

The movement control unit 12B performs control for moving, based on the observation target information 11C indicating a probability of the own vehicle being observed from the mobile body 100 around the own vehicle, the own vehicle to a position where the mobile body 100 around the own vehicle is capable of observing the own vehicle. The movement control unit 12B has a function of planning the route L of the mobile body 100 and changing the route L. The movement control unit 17 outputs an operation command and the like for realizing the plan information 11E in the storing unit 11 to the driving unit 130. The movement control unit 12B controls, based on the self-position and the route L of the own vehicle indicated by the plan information 11E, driving of the driving unit 130 such that the own vehicle moves along the route L. As a result, the moving mechanism operates according to the driving of the driving unit 130, whereby the mobile body 100 moves along the route L.

The movement control unit 12B performs control for moving, based on the observation target information 11C of the storing unit 11, the own vehicle to a position observable by another mobile body 100. For example, the movement control unit 12B changes, based on the probability of being observed map of the observation target information 11C, the route L such that the own vehicle reaches a target position (a destination) while being observed by another mobile body 100. A method of changing the route is explained below. The movement control unit 12B controls driving of the driving unit 130 such that the own vehicle moves along the changed route L.

The movement control unit 12B determines whether a self-position of the own vehicle is valid. The movement control unit 12B determines, based on the self-position and the determination information 11B, whether the self-position is valid. For example, the movement control unit 12B compares the self-position and a position in the past, a target position, or the like and, when a difference between the positions is equal to or more than a determination threshold, determines that the self-position is invalid. The determination threshold includes, for example, a value indicating a distance that the own vehicle can move per unit time, a deviation degree from the route L, or the like.

When determining that the self-position of the own vehicle is valid, the movement control unit 12B performs control for moving the own vehicle to a position observable by another mobile body 100. In addition, when determining that the self-position of the own vehicle is invalid, the movement control unit 12B performs control for moving the own vehicle to a position observable by the other mobile body 100.

The acquiring unit 12C acquires the correction information 11H capable of specifying a relative positional relation between the own vehicle and the other mobile body 100 from the other mobile body 100 that observes the own vehicle. The acquiring unit 12C acquires the correction information 11H from the other mobile body 100, for example, by communication via the communication unit 120 and stores the correction information 11H in the storing unit 11. When the own vehicle is observed at different times by the plurality of other mobile bodies 100, the acquiring unit 12C acquires the correction information 11H from the plurality of other mobile bodies 100 and stores a plurality of kinds of correction information 11H in association with one another in the storing unit 11.

The correcting unit 12D corrects the self-position of the own vehicle based on the correction information 11H. For example, the correcting unit 12D specifies the position (position coordinates) of the own vehicle observed by another mobile body 100 based on the correction information 11H, and corrects the self-position information 11A of the storing unit 11 such that the position becomes the self-position. That is, the correcting unit 12D changes the self-position to the position of the own vehicle observed by the other mobile body 100. When the correction information 11H is acquired from the plurality of mobile bodies 100, the correcting unit 12D specifies the position of the own vehicle from each of a plurality of kinds of correction information 11H and corrects the self-position based on a plurality of positions.

The first generating unit 12E generates, based on the movement plan of the other mobile body 100, the observation target information 11C indicating a relation between a probability of the own vehicle being observed from the other mobile body 100 and the position of the own vehicle. The first generating unit 12E dynamically generates the observation target information 11C based on the plan information 11E indicating a time-added movement plan of the other mobile body 100 and the sensor model information 11G of the other mobile body 100. For example, the first generating unit 12E calculates a probability of the other mobile body 100 being able to observe the own vehicle based on the sensor model when the own vehicle is present in a posture c at time t in a terrain map. The first generating unit 12E generates the observation target information 11C including the probability of being observed map indicating the calculated probability and stores the observation target information 11C in the storing unit 11.

The functional configuration example of the information processing apparatus 10A on the observed side according to the present embodiment is explained above. Note that the configuration explained above with reference to FIG. 2 is merely an example, and a functional configuration of the information processing apparatus 10A on the observed side according to the present embodiment is not limited to such an example. The functional configuration of the information processing apparatus 10A on the observed side according to the present embodiment can be flexibly modified according to specifications and operations.

[Example of the Observation Target Information]

Figure 3:
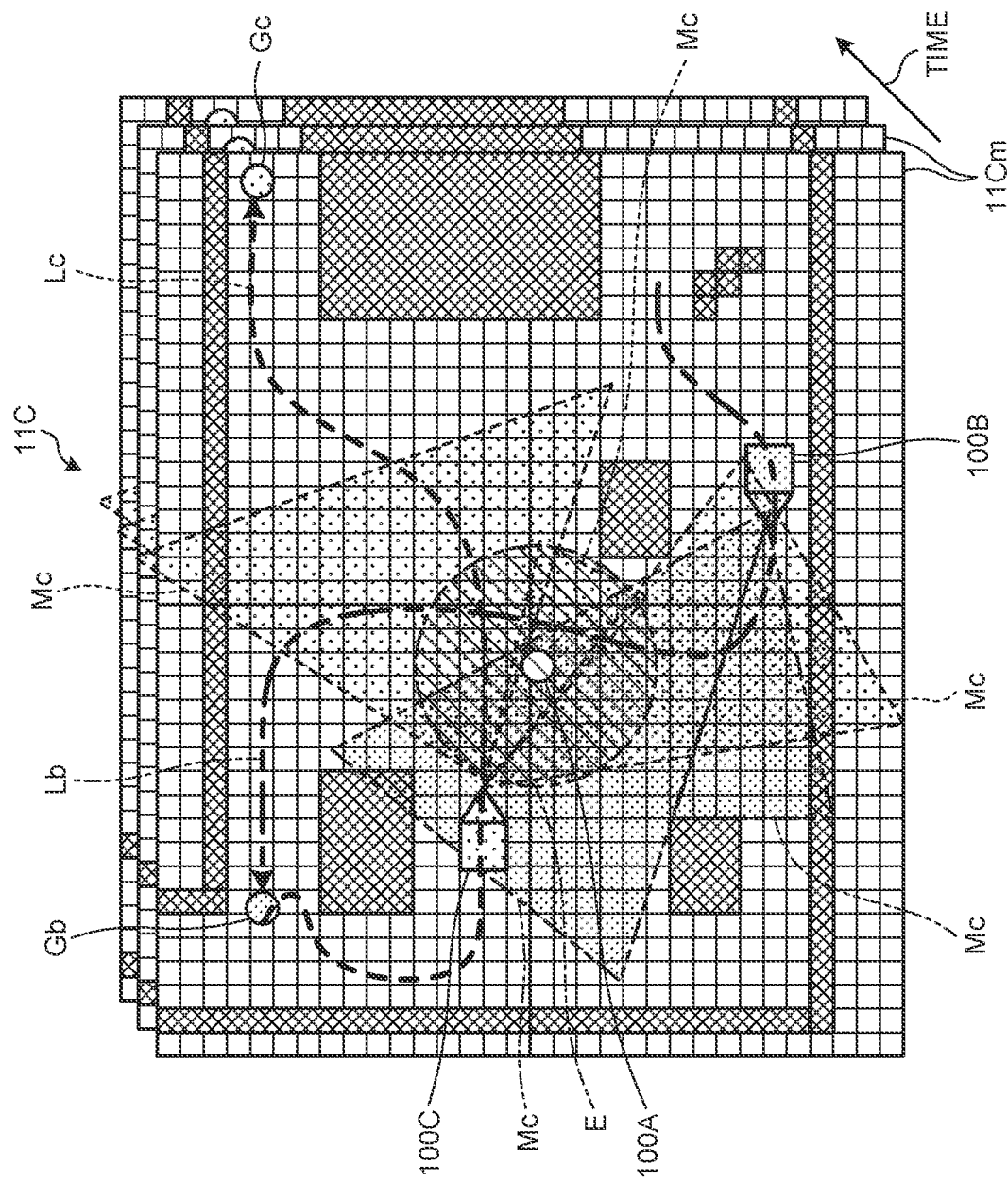
FIG. 3 is a diagram for explaining an example of observation target information according to the embodiment.

FIG. 3 is a diagram for explaining an example of the observation target information 11C according to the embodiment. As illustrated in FIG. 3, the observation target information 11C includes a plurality of maps 11Cm corresponding to a plurality of times different from one another. The map 11Cm is an example of the probability of being observed map. The map 11Cm includes, for example, a terrain map. The observation target information 11C includes information indicating a positional relation between the mobile bodies 100 on the observing side and the observed side in time series in the terrain map. The observation target information 11C includes information indicating the plurality of maps 11Cm in time series. The plurality of maps 11Cm are maps indicating the position of the mobile body 100 at each time.

For example, the map 11Cm at certain time t is a map showing the positions of the mobile body 100A on the observed side and the mobile body 100B and the mobile body 100C on the observed side and terrain. The map 11Cm distinguishably shows, for example, a movable area and an obstacle. The map 11Cm shows the positions of the mobile body 100B and the mobile body 100C capable of observing the mobile body 100A, a route Lb and a route Lc, and a target position Gb and a target position Gc. The map 11Cm shows a sensor model Mc of the mobile body 100B and the mobile body 100C at the time t. The sensor model Mc includes a sensor field of view and a region that can be observed by the sensor unit 110 of the mobile body 100. The map 11Cm indicates an area E where the mobile body 100A is movable. In the map 11Cm, the movable region E and a part overlapping the sensor model Mc are regions highly probably observed by the mobile body 100B and the mobile body 100C.

The observation target information 11C can define a probability of the peripheral mobile body 100B and mobile body 100C in the periphery having the sensor model being able to observe the mobile body 100A when the mobile body 100A is present in the posture C at the time t on the map 11Cm.

For example, the observation target information 11C can represent an observed probability $_s(c, t)$ that a peripheral mobile body k having SensorModel$_k$ placed in $p_k(t)$ can observe a target mobile body s when the target mobile body s is present in the posture c at the time t on the map 11Cm by Formula (1).

$$\text{Probability of being observed}_s(c, t) = \sum_{k=0}^{n} \frac{P\{Observable_k\{p_k(t), c, SensorModel_k, \text{map}\}|p_s(c, t)\}}{n} \quad (1)$$

t: time
s: target mobile body
c: posture of the target mobile body in a global coordinate system (corresponding to a cell position and a direction of a grid)
n: number of peripheral mobile bodies
k: k-th peripheral mobile body
$p_k(t)$: posture distribution probability of the k-th peripheral mobile body at the time t
$p_s(c, t)$: probability of the target mobile body being present in the posture c at the time t
SensorModel$_k$: view angle information of a sensor mounted on the k-th peripheral mobile body
map: terrain map
Observable$_k$ ($p_k$, c, SensorModel$_k$, map): probability of SensorModel$_k$ being able to be mounted and the target mobile body having the posture $p_k$ being able to be observed on the terrain map map.

For example, the observed probability $_s(c, t)$ can represent, based on information on an obstacle shown by the terrain map map, a probability of observation not being able to be performed because of the obstacle on the terrain map map. For example, the observed probability $s(c, t)$ can represent, based on the viewing angle information, that the probability of observation not being able to be performed increases due to a sensor having a narrow viewing angle. For example, the observed probability $_s(c, t)$ can represent that relative postures between the mobile bodies is calculated from the probability $p_k(t)$ and the posture c and the prob- ability of observation not being able to be performed increases because the relative postures are excessively separated.

[Configuration Example of the Information Processing Apparatus on the Observing Side]

Figure 4:
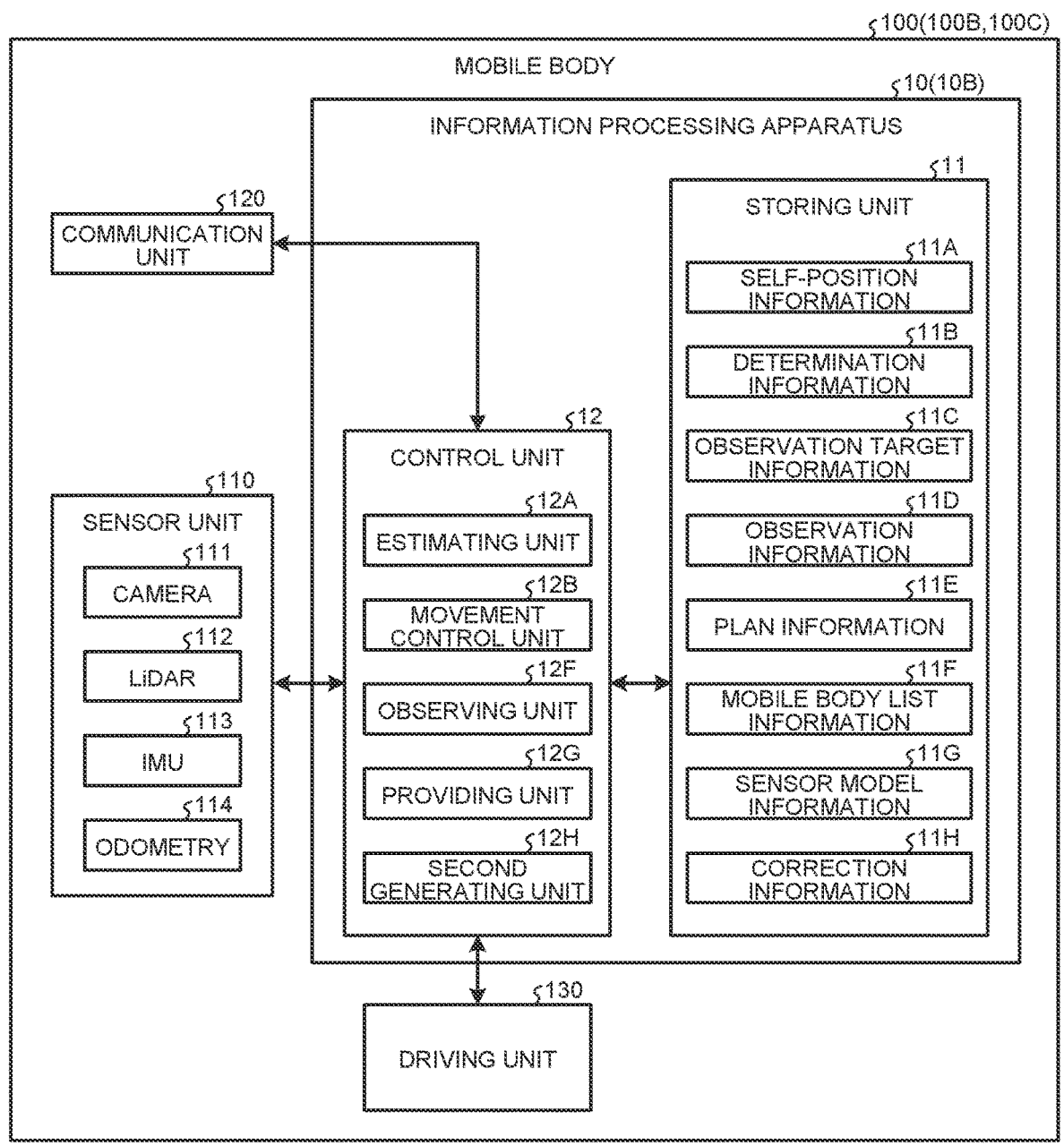
FIG. 4 is a diagram for explaining an example of a mobile body on an observing side and an information processing apparatus according to the embodiment.

FIG. 4 is a diagram for explaining an example of the mobile body and the information processing apparatus on the observing side according to the embodiment. As illustrated in FIG. 4, the mobile body 100 (100B, 100C) includes the sensor unit 110, the communication unit 120, the driving unit 130, and the information processing apparatus 10 (10B). That is, in the present embodiment, the mobile body 100A, the mobile body 100B, and the mobile body 100C have the same configuration. However, the mobile body 100A, the mobile body 100B, and the mobile body 100C may have different configurations.

The information processing apparatus 10B is mounted on, for example, the mobile body 100B and the mobile body 100C on the observing side and is a dedicated or general-purpose computer. The information processing apparatus 10B includes the storing unit 11 and the control unit 12. The storing unit 11 and the control unit 12 are connected to be capable of exchanging data and information. In the following explanation, the information processing apparatus 10 is sometimes explained as an "observing side apparatus".

Similarly to the information processing apparatus 10A on the observed side, the storing unit 11 stores, for example, information such as the self-position information 11A, the determination information 11B, the observation target information 11C, the observation information 11D, the plan information 11E, the mobile body list information 11F, the sensor model information 11G, and the correction information 11H.

The control unit 12 includes functional units such as the estimating unit 12A, the movement control unit 12B, an observing unit 12F, a providing unit 12G, and a second generating unit 12H.

The movement control unit 12B performs control for moving, based on the observation information 11D of the storing unit 11, the second mobile body to a position where the second mobile body is capable of observing the mobile body 100A (first mobile body). The movement control unit 12B has a function of planning the route L of the second mobile body and changing the route L. The movement control unit 17 outputs an operation command and the like for realizing the plan information 11E in the storing unit 11 to the driving unit 130. The movement control unit 12B controls, based on the self-position and the route L of the own vehicle indicated by the plan information 11E, driving of the driving unit 130 such that the own vehicle moves along the route L. As a result, the moving mechanism operates according to the driving of the driving unit 130, whereby the mobile body 100B and the mobile body 100C move along the route L.

The movement control unit 12B performs control for moving, based on the target position of the second mobile body on the observed side and the observation information 11D in the storing unit 11, the own vehicle to a position where the own vehicle is capable of observing the mobile body 100A on the observed side. For example, the movement control unit 12B changes, based on the observation probability map of the observation information 11D the route L such that the own vehicle reaches a target position (a destination) while observing the observation target mobile body 100A. A method of changing the route L is explained below. The movement control unit 12B controls driving of the driving unit 130 such that the own vehicle moves along the changed route L.

When acquiring an observation request from the mobile body 100A on the observed side, the movement control unit 12B performs control for moving the second mobile body on the observing side to a position where the second mobile body is capable of observing the mobile body 100A on the observed side. In addition, when the movement control unit 12B does not acquire the observation request from the mobile body 100A on the observed side, the movement control unit 12B does not perform control for moving the second mobile body on the observing side to a position where the second mobile body is capable of observing the mobile body 100A on the observed side.

The observing unit 12F observes the mobile body 100 around the second mobile body on which the information processing apparatus 10B is mounted. For example, when the second mobile body is the mobile body 100B, the peripheral mobile body 100 includes, for example, the mobile body 100A and another mobile body 100C. The observing unit 12F observes, for example, based on the sensor data supplied from the sensor unit 110, the observation region V of the mobile body 100 on which the observing side apparatus is mounted. When observing that the mobile body 100 is present in the observation region V, the observing unit 12F stores position information indicating a relation between relative positions of the observed mobile body 100 and the own vehicle in the storing unit 11. The position information includes, for example, information such as a self-position of the own vehicle and a distance and a direction from the self-position to the observed mobile body 100.

The providing unit 12G provides, to the information processing apparatus 10A of the mobile body 100A on the observed side, the correction information 11H capable of specifying a relation between relative positions of the observed mobile body 100A on the observed side and the mobile body 100B or 100C on the observing side. The providing unit 12G generates, for example, the correction information 11H including position information observed by the observing unit 12F and identification information of the observing side apparatus, and stores the correction information 11H in the storing unit 11. The providing unit 12G transmits the correction information 11H to the information processing apparatus 10 at observation request source via the communication unit 120.

The second generating unit 12H generates, based on a movement plan of another mobile body 100, the observation information 11D indicating a relation between a probability of observing the other mobile body 100 around the own vehicle and the position of the other mobile body 100. The second generating unit 12H generates the observation information 11D based on the plan information 11E indicating the time-added movement plan of the other mobile body 100 and the sensor model information 11G. The second generating unit 12H generates the observation information 11D indicating, as a map or the like, a probability of the observing side apparatus observing the peripheral mobile body 100 when the own vehicle is present in the posture c at the time t. The second generating unit 12H stores the generated observation information 11D in the storing unit 11.

The functional configuration example of the information processing apparatus 10B on the observing side according to the present embodiment is explained above. Note that the configuration explained above with reference to FIG. 4 is merely an example and the functional configuration of the information processing apparatus 10B on the observing side according to the present embodiment is not limited to such an example. The functional configuration of the information processing apparatus 10B on the observing side according to the present embodiment can be flexibly modified according to specifications and operations.

[Example of the Observation Information]

Figure 5:
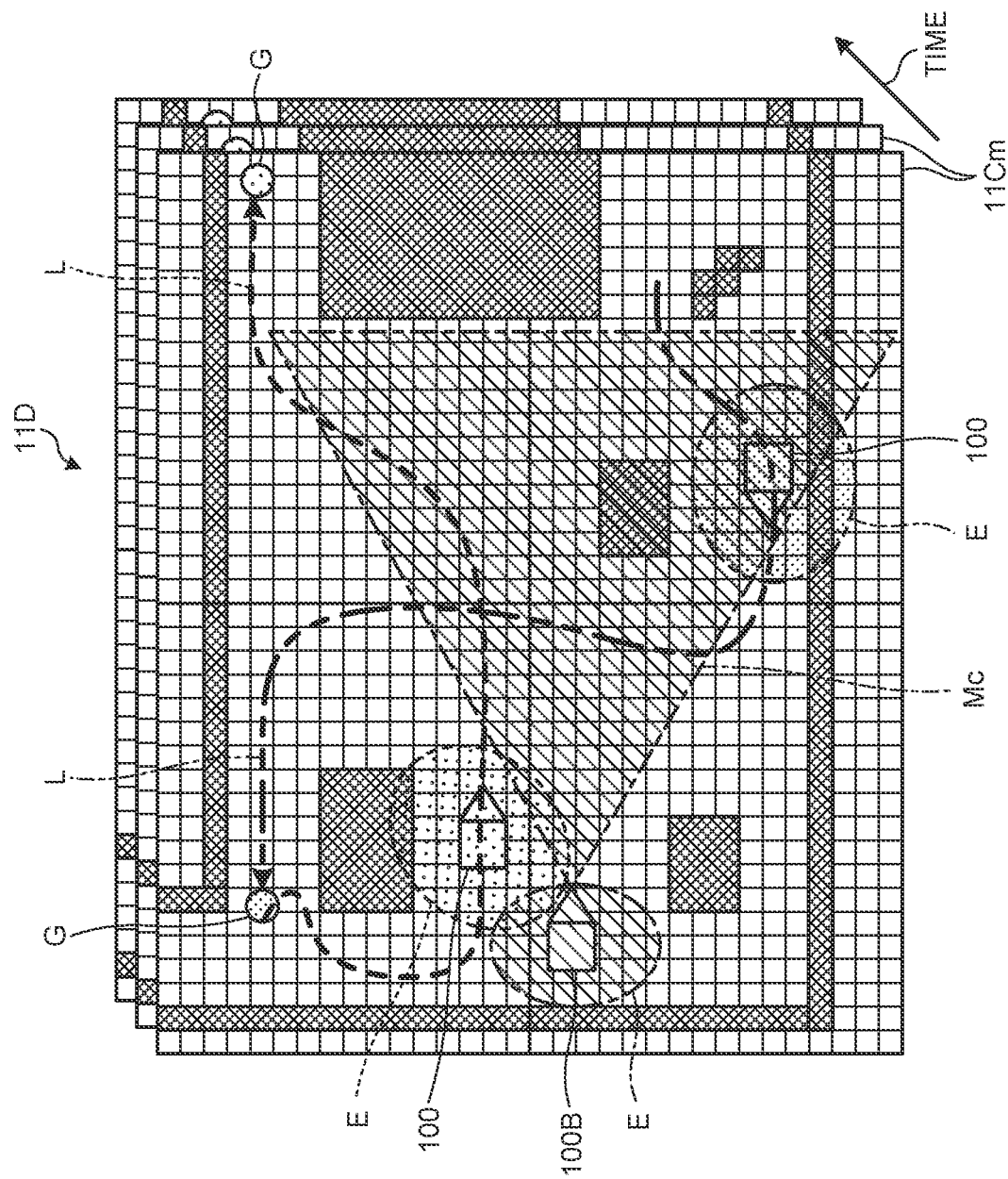
FIG. 5 is a diagram for explaining an example of observation information according to the embodiment.

FIG. 5 is a diagram for explaining an example of the observation information 11D according to the embodiment. As illustrated in FIG. 5, the observation information 11D includes a plurality of maps 11Cm corresponding to a plurality of times different from one another. The observation information 11D includes information indicating a positional relation between the mobile body 100B on the observing side and the peripheral mobile body 100 in time series on the terrain map. The observation information 11D includes information indicating the plurality of maps 11Cm in time series. The plurality of maps 11Cm are maps indicating the position of the mobile body 100 at each time and an observation region of the mobile body 100B on the observing side.

For example, the map 11Cm at certain time t is a map indicating the positions of the mobile body 100B on the observing side and the peripheral mobile body 100, and terrain. The map 11Cm indicates the position of the mobile body 100 that can be observed by the mobile body 100B and the route L and the target position G of the peripheral mobile body 100. The map 11Cm indicates the sensor model Mc of the mobile body 100B on the observing side at the time t. The map 11Cm indicates the position of the mobile body 100B on the observing side and the region E where the mobile body 100 around the position can move. The map 11Cm represents, as an establishment field, a moving point where the mobile body 100B on the observing side can observe the peripheral mobile body 100.

The observation information 11D can define a probability of the peripheral mobile body 100 being able to be observed when the mobile body 100A having the sensor model Mc is present in the posture C at the time t on the map 11Cm.

For example, the observation information 11D can represent a point where it is highly likely that the peripheral mobile body 100 can be observed more at the time when the viewing angle is moved in the movable region E of the mobile body 100B on the observing side. That is, the observation information 11D can represent the observation probability $_s(c, t)$ with Expression (2) by reversing the relation between the observing side and the observed side in Expression (1) explained above indicated by the observation target information 11C.

$$\text{Observation } probability_s(c, t) = \sum_{k=0}^{n} \frac{P\{Observable_s\{c, p_k(t), SensorModel_s, \text{map}\}|p_s(c, t)\}}{n} \quad (2)$$

t: time
s: target mobile body
c: posture of the target mobile body in a global coordinate system (corresponding to a cell position and a direction of a grid)
n: number of peripheral mobile bodies
k: k-th peripheral mobile body
$p_k(t)$: posture distribution probability of the k-th peripheral mobile body at the time t $p_s(c, t)$: probability of the target mobile body being present in the posture c at the time t Sensor Model$_s$: View angle information of a sensor mounted on the mobile body 100 on the observing side map: terrain map Observable$_k$ (c, $p_k$, Sensor Model$_s$, map): probability of the mobile body 100 mounted with SensorModel$_s$ and having the posture $p_k$ being able to the peripheral mobile body 100 on the terrain map map

[Processing Procedure of the Information Processing Apparatus on the Observed Side According to Embodiment]

Figure 6:
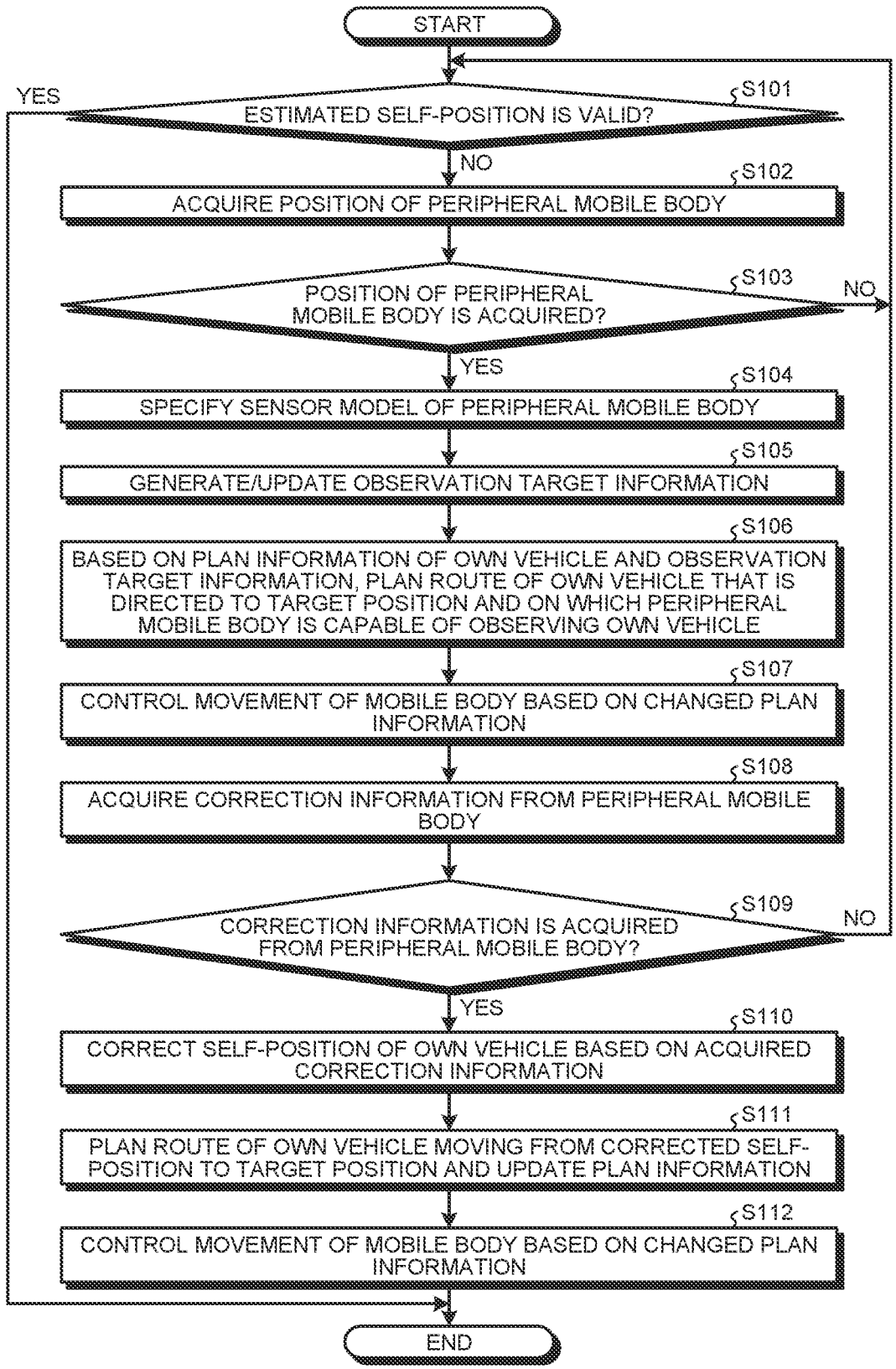
FIG. 6 is a flowchart illustrating an example of a processing procedure executed by an information processing apparatus on an observed side according to the embodiment.

Subsequently, an example of a processing procedure of the information processing apparatus 10A on the observed side according to the embodiment is explained. FIG. 6 is a flowchart illustrating an example of a processing procedure executed by the information processing apparatus 10A on the observed side according to the embodiment. The processing procedure illustrated in FIG. 6 is realized by the control unit 12 of the information processing apparatus 10A on the observed side executing a program. The processing procedure illustrated in FIG. 6 is repeatedly executed by the control unit 12 on the observed side.

As illustrated in FIG. 6, the control unit 12 of the information processing apparatus 10A determines whether an estimated self-position is valid (step S101). For example, the control unit 12 determines the validity of the self-position based on a comparison result obtained by comparing the self-position estimated by the estimating unit 12A and the self-position in the past. For example, when the compared change amount is larger than a threshold, the control unit 12 determines that the self-position is invalid. When the change amount is equal to or smaller than the threshold, the control unit 12 determines that the self-position is valid. The control unit 12 may determine the validity of the self-position based on continuity of the self-position estimated by the estimating unit 12A and the self-position in the past. When determining that the estimated self-position is valid (Yes in step S101), the control unit 12 ends the processing procedure illustrated in FIG. 6.

When determining that the estimated self-position is invalid (No in step S101), the control unit 12 advances the processing to step S102. The control unit 12 acquires the position of the peripheral mobile body 100 (step S102). For example, the control unit 12 acquires the self-position estimated by another mobile body 100 via the communication unit 120 or acquires the position of the other mobile body 100 from the plan information 11E. After storing an acquisition result of the position in the storing unit 11, the control unit 12 advances the processing to step S103.

The control unit 12 determines, based on the acquisition result of the storing unit 11, whether the position of the peripheral mobile body 100 is acquired (step S103). When determining that the position of the peripheral mobile body 100 is not acquired (No in step S103), the control unit 12 returns the processing to step S101 explained above. On the other hand, when determining that the position of the peripheral mobile body 100 is acquired (Yes in step S103), the control unit 12 advances the processing to step S104.

The control unit 12 specifies a sensor model of the peripheral mobile body 100 (step S104). For example, the control unit 12 specifies a sensor model of the peripheral mobile body 100 based on the sensor model information 11G. After specifying the sensor model, the control unit 12 advances the processing to step S105.

The control unit 12 generates and updates the observation target information 11C (step S105). For example, the control unit 12 generates, based on the movement plan of the other mobile body 100, the observation target information 11C indicating a relation between a probability of the own vehicle from being observed from the other mobile body 100 and the position of the own vehicle and updates the observation target information 11C stored in the storing unit 11. For example, the control unit 12 generates the observation target information 11C by executing observation target information generation processing explained below. The control unit 12 functions as the first generating unit 12E explained above by executing the processing in step S105. When the processing in step S105 ends, the control unit 12 advances the processing to step S106.

Based on the plan information 11E and the observation target information 11C of the own vehicle, the control unit 12 plans the route L of the own vehicle which is directed to a target position and on which the peripheral mobile body 100 is capable of observing the own vehicle (step S106). For example, in the probability of being observed map of the observation target information 11C, the control unit 12 plans the route L such that the own vehicle reaches the target position (a destination) while being observed by another mobile body 100. After changing the movement plan of the own vehicle in the plan information 11E based on the planned result, the control unit 12 advances the processing to step S107.

The control unit 12 controls movement of the mobile body 100 based on the changed plan information 11E (step S107). For example, the control unit 12 controls driving of the driving unit 130 such that the own vehicle moves along the changed route L. As a result, the mobile body 100 moves along the changed route L and moves toward the target position. When the processing in step S107 ends, the control unit 12 advances the processing to step S108.

The control unit 12 acquires correction information 11H from peripheral mobile body 100 (step S108). For example, the control unit 12 transmits an observation request to the peripheral mobile body 100 via the communication unit 120. Then, the control unit 12 acquires the correction information 11H provided by the peripheral mobile body 100 via the communication unit 120 and stores the correction information 11H in the storing unit 11. When the correction information 11H is not successfully acquired from the peripheral mobile body 100 within a predetermined time, the control unit 12 stores, in the storing unit 11, an acquisition result indicating that the correction information is not successfully acquired. When the processing in step S108 ends, the control unit 12 advances the processing to step S109.

Based on the acquisition result in the storing unit 11, the control unit 12 determines whether the correction information 11H is acquired from the peripheral mobile body 100 (step S109). When determining that the correction information 11H is not acquired from the peripheral mobile body 100 (No in step S109), the control unit 12 returns the processing to step S101 explained above. On the other hand, when determining that correction information 11H is acquired from peripheral mobile body 100 (Yes in step S109), the control unit 12 advances the processing to step S110.

The control unit 12 corrects the self-position of the own vehicle based on the acquired correction information 11H (step S110). For example, the control unit 12 specifies the position (a position coordinate) of the own vehicle observed by another mobile body 100 based on the correction information 11H and corrects the self-position information 11A of the storing unit 11 such that the position becomes a self-position. When the processing in step S110 ends, the control unit 12 advances the processing to step S111.

The control unit 12 plans the route L of the own vehicle moving from the corrected self-position toward the target position and updates the plan information 11E (step S111). For example, the control unit 12 plans a new route L of the own vehicle based on the corrected self-position, the route L indicated by the plan information 11E, the target position, and the like and reflects the new route L on the plan information 11E in the storing unit 11. When the processing in step S111 ends, the control unit 12 advances the processing to step S112.

The control unit 12 controls the movement of the mobile body 100 based on the changed plan information 11E (step S112). For example, the control unit 12 controls driving of the driving unit 130 such that the own vehicle moves along the changed route L. As a result, the mobile body 100 moves from the corrected self-position along the changed route L and moves toward the target position. When the processing in step S112 ends, the control unit 12 ends the processing procedure illustrated in FIG. 6.

[Example of the Observation Target Information Generation Processing]

Figure 7:
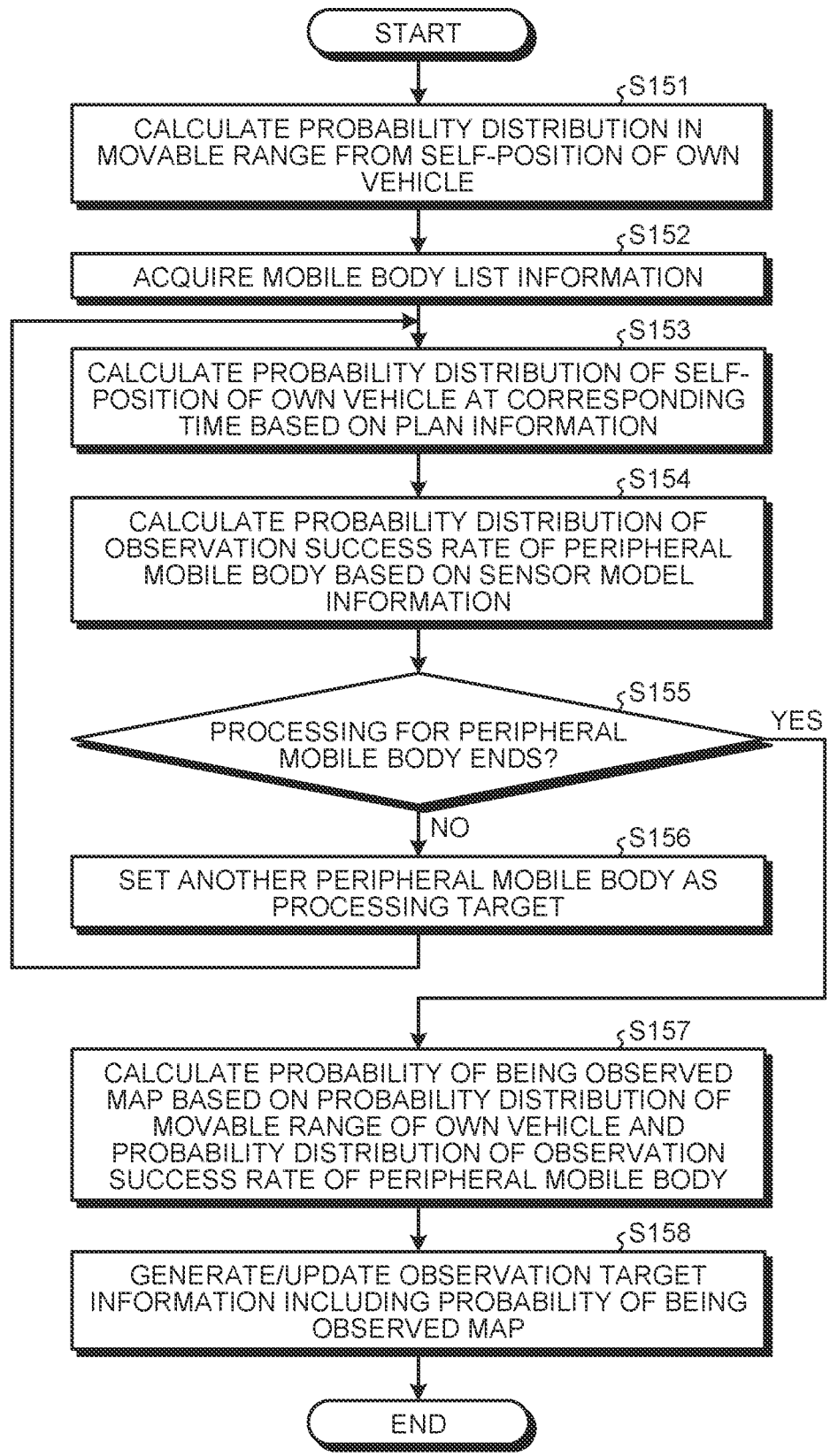
FIG. 7 is a flowchart illustrating an example of observation target information generation processing executed by the information processing apparatus on the observed side according to the embodiment.

FIG. 7 is a flowchart illustrating an example of observation target information generation processing executed by the information processing apparatus 10 on the observed side according to the embodiment. The processing procedure illustrated in FIG. 7 is executed by the control unit 12 of the information processing apparatus 10A in the processing in step S105 illustrated in FIG. 6. The observation target information generation processing is, for example, processing of generating the observation target information 11C corresponding to a preset time range.

As illustrated in FIG. 7, the control unit 12 of the information processing apparatus 10A calculates a probability distribution in a movable range from the self-position of the own vehicle (step S151). For example, the control unit 12 calculates a self-position of the own vehicle on the observed side for each future time and calculates a probability distribution in the case in which the own vehicle is movable from the self-position. The control unit 12 acquires the mobile body list information 11F (step S152). Then, the control unit 12 executes the processing in step S153 and step S154 on each of the peripheral mobile bodies 100 indicated by the mobile body list information 11F.

The control unit 12 calculates a probability distribution of the self-position of the own vehicle at the corresponding time based on the plan information 11E (step S153). After storing the calculated probability distribution of the self-position of the own vehicle in the storing unit 11 in association with the time, the control unit 12 advances the processing to step S154.

The control unit 12 calculates a probability distribution of an observation success rate of the peripheral mobile body 100 based on the sensor model information 11G (step S154). After storing the calculated probability distribution of the observation success rate of the peripheral mobile body 100 in the storing unit 11 in association with the identification information and the time of the peripheral mobile body 100, the control unit 12 advances the processing to step S155.

The control unit 12 determines whether the processing for the peripheral mobile body 100 has ended (step S155). For example, when the processing for all the peripheral mobile bodies 100 indicated by the mobile body list information 11F is executed, the control unit 12 determines that the processing for the peripheral mobile bodies 100 has ended. When determining that the processing for the peripheral mobile body 100 has not ended (No in step S155), the control unit 12 advances the processing to step S156. The control unit 12 sets another peripheral mobile body 100 as a processing target (step S156) and returns the processing to step S153 explained above.

In addition, when determining that the processing for the peripheral mobile body 100 has ended (Yes in step S155), the control unit 12 advances the processing to step S157. The control unit 12 calculates a probability of being observed map based on the probability distribution in the movable range of the own vehicle and the probability distribution of the observation success rate of the peripheral mobile body 100 (step S157). For example, the control unit 12 divides the space around the own vehicle into grids and scans the grids at each time, and calculates a probability of being observed map based on the probability distribution in the movable range of the own vehicle and the probability distribution of the observation success rate of the peripheral mobile body 100. Then, after calculating the probability of being observed map at each time, the control unit 12 stores the corresponding time and the probability of being observed map in association with each other in the storing unit 11. When the processing in step S157 ends, the control unit 12 advances the processing to step S158.

The control unit 12 generates and updates the observation target information 11C including the probability of being observed map (step S158). For example, the control unit 12 generates the observation information 11D including a plurality of probability of being observed maps corresponding to a plurality of times different from one another, and updates the observation target information 11C in the storing unit 11. When the processing in step S158 ends, the control unit 12 ends the processing procedure illustrated in FIG. 7.

[Processing Procedure of the Information Processing Apparatus on the Observing Side According to the Embodiment]

Figure 8:
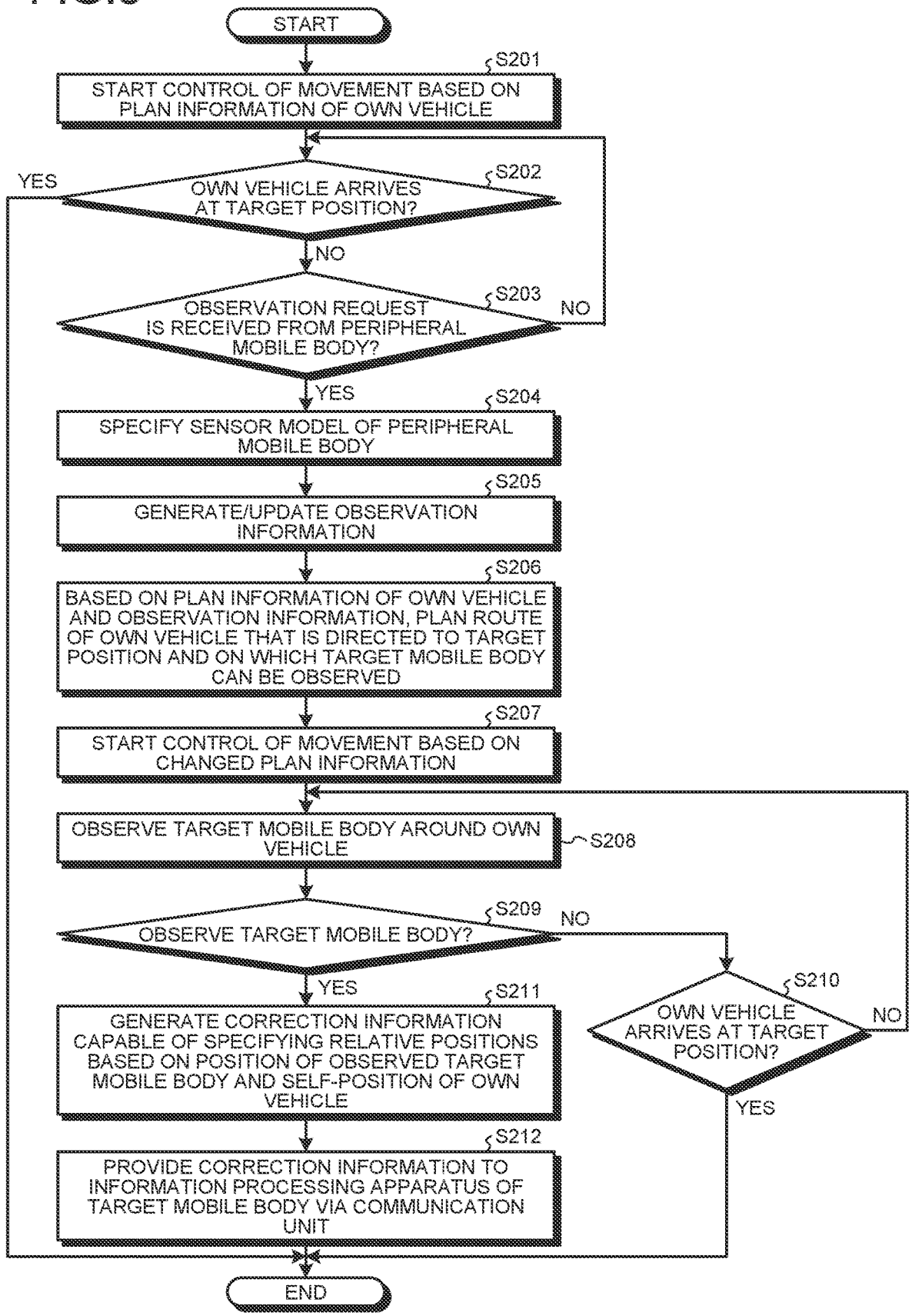
FIG. 8 is a flowchart illustrating an example of a processing procedure executed by the information processing apparatus on the observing side according to the embodiment.
Figure 9:
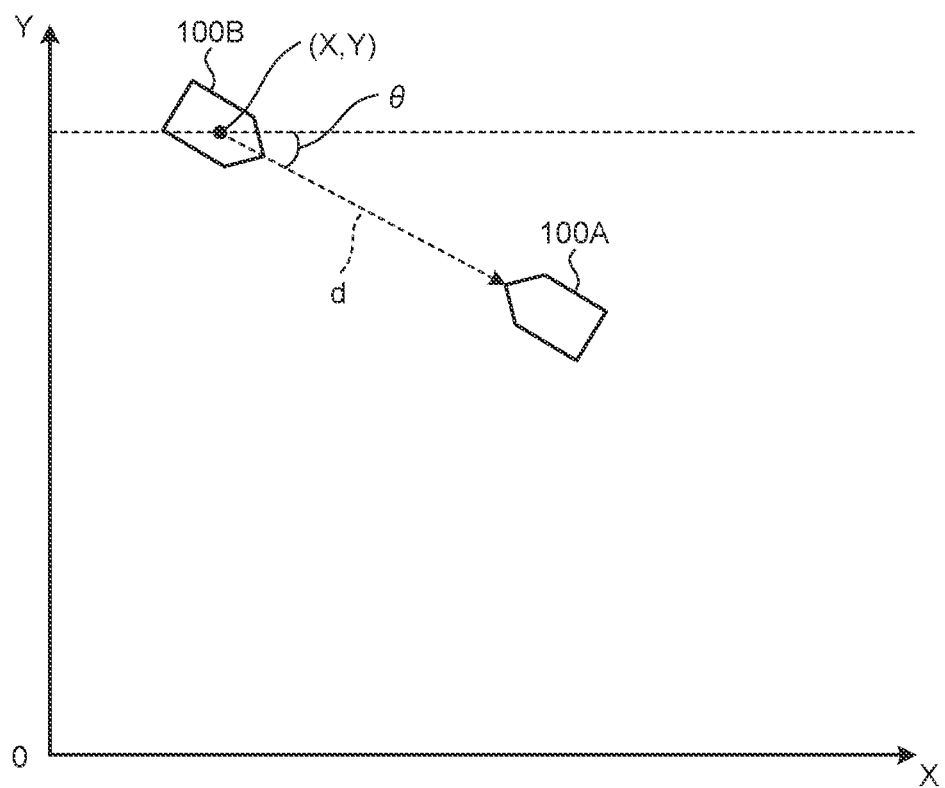
FIG. 9 is a diagram for explaining an example of correction information according to the embodiment.

Subsequently, an example of a processing procedure of the information processing apparatus 10B on the observing side according to the embodiment is explained. FIG. 8 is a flowchart illustrating an example of a processing procedure executed by the information processing apparatus 10 on the observing side according to the embodiment. FIG. 9 is a diagram for explaining an example of the correction information 11H according to the embodiment. The processing procedure illustrated in FIG. 8 is realized by the control unit 12 of the information processing apparatus 10B on the observing side executing a program. The processing procedure illustrated in FIG. 8 is repeatedly executed by the control unit 12 on the observing side.

As illustrated in FIG. 8, the control unit 12 of the information processing apparatus 10B starts control of movement based on the plan information 11E of the own vehicle (step S201). For example, the control unit 12 starts driving control of the driving unit 130 such that the own vehicle moves along the route L of the own vehicle indicated by the plan information 11E. As a result, the mobile body 100 starts movement along the route L from the current position toward a target position. When the processing in step S201 ends, the control unit 12 advances the processing to step S202.

The control unit 12 determines whether the own vehicle has arrived at the target position (step S202). For example, when the estimated self-position coincides with the target position, the control unit 12 determines that the own vehicle has arrived at the target position. When determining that the own vehicle has arrived at the target position (Yes in step S202), the control unit 12 ends the processing procedure illustrated in FIG. 8. When determining that the own vehicle has not arrived at the target position (No in step S202), since the own vehicle is moving, the control unit 12 advances the processing to step S203.

The control unit 12 determines whether an observation request is received from the peripheral mobile body 100 via the communication unit 120 (step S203). When determining that the observation request is not received from the peripheral mobile body 100 (No in step S203), the control unit 12 returns the processing to step S202 explained above. In addition, when determining that an observation request is received from the peripheral mobile body 100 (Yes in step S203), the control unit 12 advances the processing to step S204.

The control unit 12 specifies a sensor model of the peripheral mobile body 100 (step S204). For example, the control unit 12 specifies a sensor model of the peripheral mobile body 100 based on the sensor model information 11G. After specifying the sensor model, the control unit 12 advances the processing to step S205.

The control unit 12 generates and updates the observation information 11D (step S205). For example, the control unit 12 generates, based on the movement plan of the other mobile body 100 indicated by the plan information 11E and the sensor model, the observation information 11D indicating a relation between the probability of observing the other mobile body 100 around the own vehicle and the position of the own vehicle. For example, the control unit 12 generates the observation information 11D by executing observation information generation processing explained below. The control unit 12 updates the observation information 11D stored in the storing unit 11 to the generated observation information 11D. The control unit 12 functions as the second generating unit 12H explained above by executing the processing in step S205. When the processing in step S205 ends, the control unit 12 advances the processing to step S206.

Based on the plan information 11E and the observation information 11D of the own vehicle, the control unit 12 plans the route L of the own vehicle moving to the target position and capable of observing the target mobile body 100 (step S206). For example, the control unit 12 plans the route L such that the own vehicle reaches the target position (a destination) while observing another mobile body 100 in the observation probability map of the observation information 11D. After changing the movement plan of the own vehicle in the plan information 11E based on the planned result, the control unit 12 advances the processing to step S207.

The control unit 12 starts control of movement based on the changed plan information 11E (step S207). For example, the control unit 12 starts driving control of the driving unit 130 such that the own vehicle moves along the changed route L. As a result, the mobile body 100 starts movement along the route L with a high probability of the own vehicle reaching the target position (the destination) while observing the other mobile body 100. When the processing in step S207 ends, the control unit 12 advances the processing to step S208.

The control unit 12 observes the target mobile body 100 around the own vehicle (step S208). For example, the control unit 12 observes, based on the sensor data supplied from the sensor unit 110, the observation region V of the mobile body 100 on which the observing side apparatus is mounted. When observing that the target mobile body 100 is present in the observation region V, the control unit 12 stores position information indicating a relation between relative positions of the observed mobile body 100 and the own vehicle in the storing unit 11. When the processing in step S208 ends, the control unit 12 advances the processing to step S209.

The control unit 12 determines, based on the observation result in step S208, whether the target mobile body 100 is detected (step S209). When determining that the target mobile body 100 is not observed (No in step S209), the control unit 12 advances the processing to step S210.

The control unit 12 determines whether the own vehicle has arrived at the target position (step S210). When determining that the own vehicle has not arrived at the target position (No in step S210), since the own vehicle is moving, the control unit 12 returns the processing to step S208 explained above and continues the processing. When determining that the own vehicle has arrived at the target position (Yes in step S210), the control unit 12 ends the processing procedure illustrated in FIG. 8.

Furthermore, when determining that the target mobile body 100 is observed (Yes in step S209), the control unit 12 advances the processing to step S211. The control unit 12 generates, based on the position of the observed target mobile body 100 and the self-position of the own vehicle, the correction information 11H capable of specifying relative positions (step S211). For example, a scene illustrated in FIG. 9 illustrates the mobile body 100B on which the observing side apparatus is mounted and the target mobile body 100A on which the observed side apparatus is mounted. In this case, the control unit 12 specifies a global coordinate (X, Y) indicating the self-position of the own vehicle, a distance d from the own vehicle to the target mobile body 100A, and an angle θ indicating a direction from the own vehicle to the target mobile body 100A. The control unit 12 generates the correction information 11H including position information including the global coordinates (X, Y), the distance d, and the angle θ and identification information of the observing side apparatus, and stores the correction information 11H in the storing unit 11. When the processing in step S211 ends, the control unit 12 advances the processing to step S212.

The control unit 12 provides the correction information 11H to the information processing apparatus 10A of the target mobile body 100 via the communication unit 120 (step S212). For example, the correction information 11H is provided to the information processing apparatus 10A by transmitting the correction information 11H from the communication unit 120 to the information processing apparatus 10A at an observation request source. When the processing in step S212 ends, the control unit 12 ends the processing procedure illustrated in FIG. 8 in a state in which the control of the movement of the own vehicle is continued.

[Example of the Observation Information Generation Processing]

Figure 10:
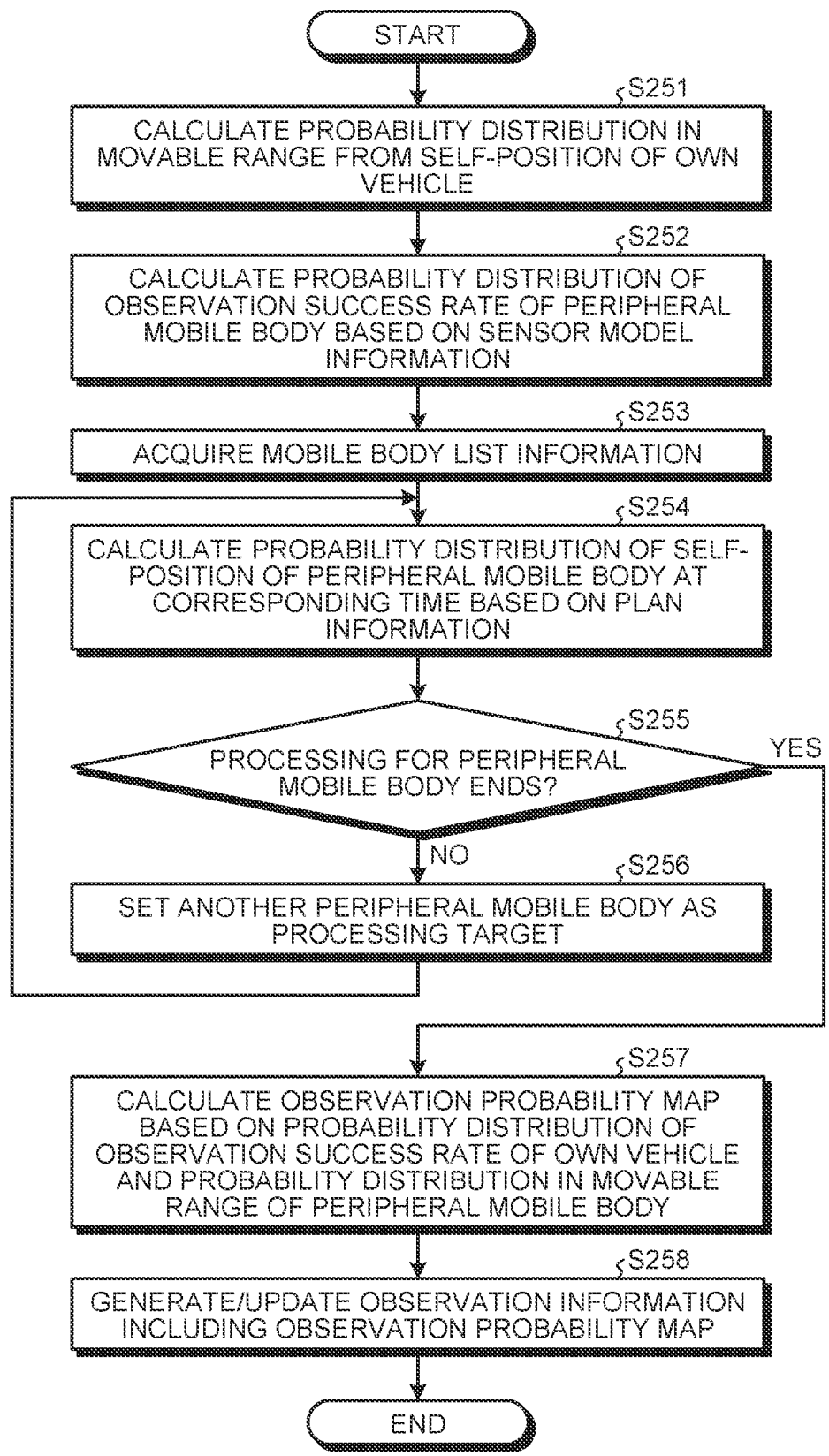
FIG. 10 is a flowchart illustrating an example of observation information generation processing executed by the information processing apparatus on the observing side according to the embodiment.

FIG. 10 is a flowchart illustrating an example of observation information generation processing executed by the information processing apparatus 10 on the observing side according to the embodiment. A processing procedure illustrated in FIG. 10 is executed by the control unit 12 of the information processing apparatus 10A in the processing in step S205 illustrated in FIG. 8. The observation information generation processing is, for example, processing for generating the observation information 11D corresponding to a preset time range.

As illustrated in FIG. 10, the control unit 12 of the information processing apparatus 10B calculates a probability distribution in a movable range from a self-position of the own vehicle (step S251). For example, the control unit 12 calculates a self-position of the own vehicle on the observing side at each future time and calculates a probability distribution in the case in which the own vehicle is movable from the self-position. The control unit 12 calculates a probability distribution of an observation success rate of the peripheral mobile body 100 based on the sensor model information 11G (step S252). The control unit 12 acquires the mobile body list information 11F (step S253). Then, the control unit 12 executes the processing in step S254 on each of the peripheral mobile bodies 100 indicated by the mobile body list information 11F.

The control unit 12 calculates a probability distribution of the self-position of the peripheral mobile body 100 at the corresponding time based on the plan information 11E (step S254). After storing the calculated probability distribution of the self-position of the peripheral mobile body 100 in the storing unit 11 in association with time, the control unit 12 advances the processing to step S255.

The control unit 12 determines whether the processing on the peripheral mobile body 100 has ended (step S255). For example, when the processing for all the peripheral mobile bodies 100 indicated by the mobile body list information 11F is executed, the control unit 12 determines that the processing for the peripheral mobile bodies 100 has ended. When determining that the processing for the peripheral mobile body 100 has not ended (No in step S255), the control unit 12 advances the processing to step S256. The control unit 12 sets another peripheral mobile body 100 as a processing target (step S256) and returns the processing to step S254 explained above.

In addition, when determining that the processing for the peripheral mobile body 100 has ended (Yes in step S255), the control unit 12 advances the processing to step S257. The control unit 12 calculates an observation probability map based on the probability distribution in the movable range of the own vehicle and the probability distribution in the movable range of the peripheral mobile body 100 (step S257). For example, the control unit 12 divides a space around the own vehicle into grids and scans the grids at each time, and calculates an observation probability map based on the probability distribution in the movable range of the own vehicle and the probability distribution in the movable range of the peripheral mobile body 100. Then, after calculating the observation probability map at each time, the control unit 12 stores the corresponding time and the observation probability map in association with each other in the storing unit 11. When the processing in step S257 ends, the control unit 12 advances the processing to step S258.

The control unit 12 generates and updates the observation information 11D including the observation probability map (step S258). For example, the control unit 12 generates the observation information 11D including a plurality of observation probability maps corresponding to a plurality of times different from one another, and updates the observation information 11D in the storing unit 11. When the processing in step S258 ends, the control unit 12 ends the processing procedure illustrated in FIG. 10.

[Configuration of an Information Processing System According to the Embodiment]

Figure 11:
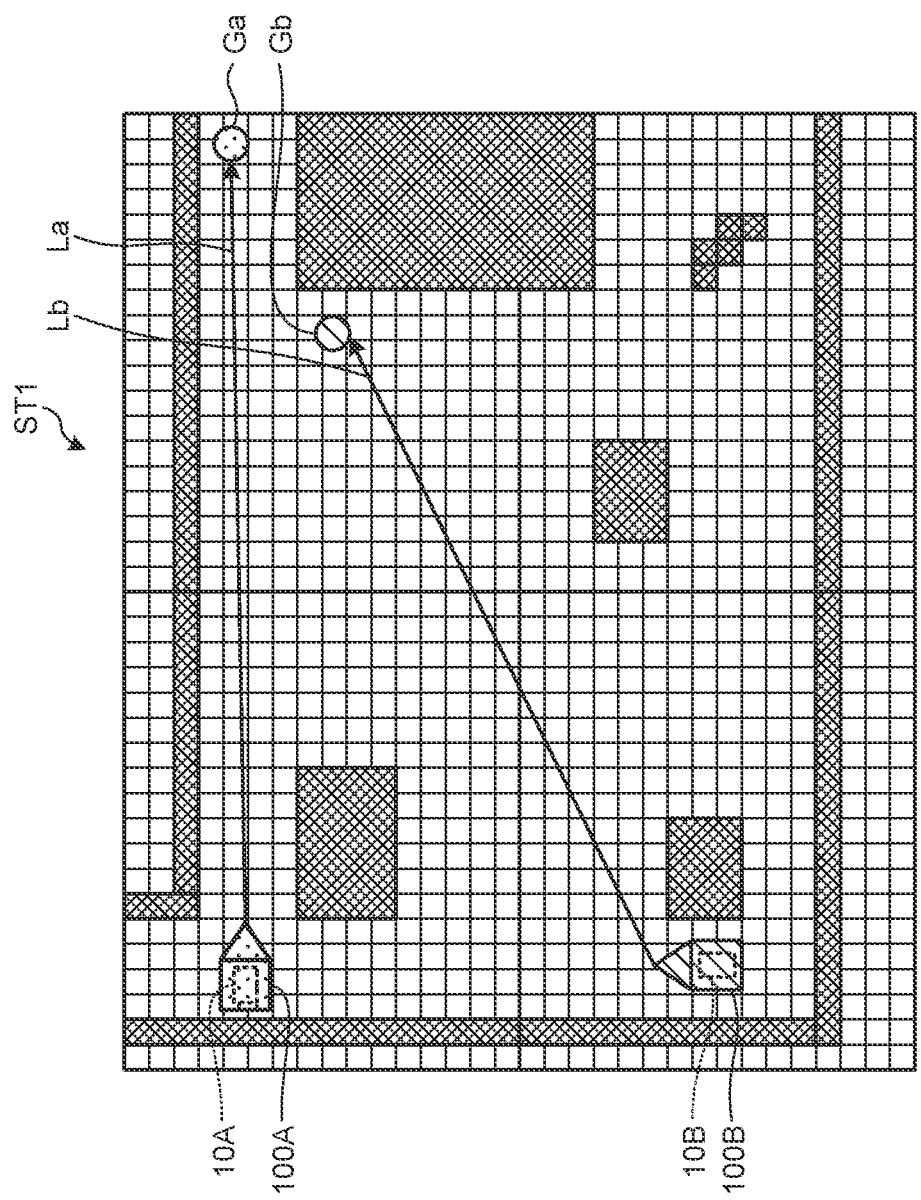
FIG. 11 is a diagram for explaining an example of an operation of the information processing system according to the embodiment.
Figure 12:
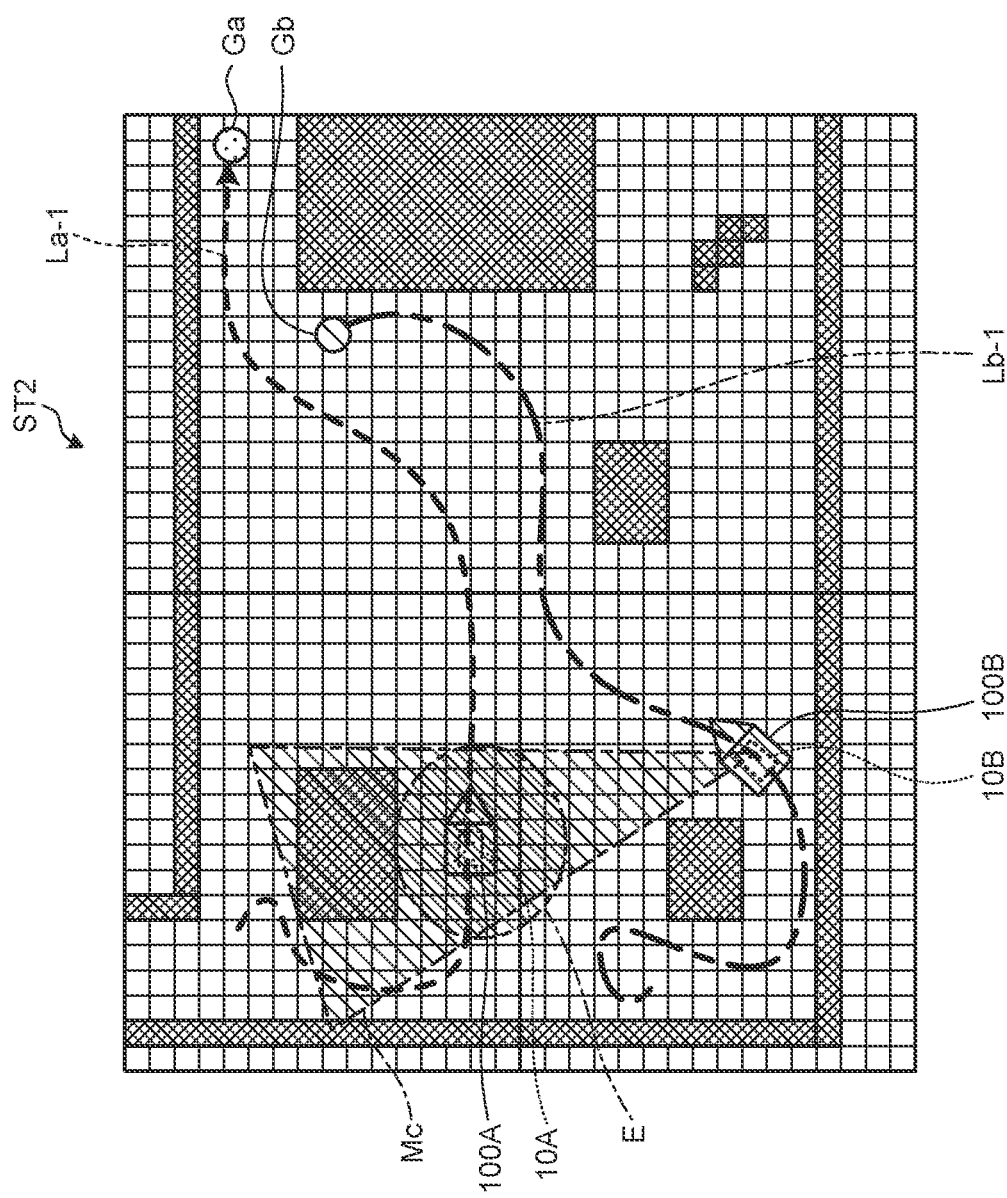
FIG. 12 is a diagram for explaining an example of an operation of the information processing system according to the embodiment.

FIG. 11 and FIG. 12 are diagrams for explaining an example of an operation of the information processing system 1 according to the embodiment.

In a scene ST1 at time t1 illustrated in FIG. 11, the information processing system 1 includes the information processing apparatus 10A mounted on the mobile body 100A and the information processing apparatus 10B mounted on the mobile body 100B. The information processing apparatus 10A plans a route La toward a target position Ga, and controls the movement of the mobile body 100A to move along the route La. The information processing apparatus 10B plans the route Lb toward the target position Gb and controls the movement of the mobile body 100B such that the mobile body 100B moves along the route Lb. Thereafter, the validity of an estimated self-position of the information processing apparatus 10A has decreased and the information processing apparatus 10A is functioning as an observed side apparatus. The validity of an estimated self-position of the information processing apparatus 10B has not decreased and the information processing apparatus 10B is functioning as an observing side apparatus.

In this case, the information processing apparatus 10A on the observed side generates the observation target information 11C indicating a probability of the own vehicle being observed from the peripheral mobile body 100B. The information processing apparatus 10A changes the route La based on the observation target information 11C to move the own vehicle to a position where the peripheral mobile body 100B is capable of observing the own vehicle. The information processing apparatus 10A transmits an observation request to the peripheral information processing apparatus 10B via the communication unit 120.

When receiving the observation request from the information processing apparatus 10A via the communication unit 120, the information processing apparatus 10B on the observing side generates observation information 10D indicating a probability of observing the mobile body 100A on which the information processing apparatus 10A is mounted. The information processing apparatus 10B changes, based on the observation information 10D, the route Lb to move the mobile body 100A to a position where the own vehicle is capable of observing the observation target mobile body 100A. The information processing apparatus 10B starts observation of the peripheral mobile body 100.

Thereafter, in a scene ST2 at time t2 illustrated in FIG. 12, the information processing apparatus 10A on the observed side moves toward the target position Ga and along a changed route La-1 on which the mobile body 100B is capable of observing the own vehicle. The information processing apparatus 10B on the observing side observes the peripheral mobile body 100 while moving toward the target position Gb and along a changed route Lb-1 capable of observing the observation target mobile body 100A. Then, after observing the target mobile body 100A, the information processing apparatus 10B generates the correction information 11H capable of specifying relative positions of the observed mobile body 100A and the mobile body 100B, and provides the correction information 11H to the information processing apparatus 10A of the mobile body 100A.

When acquiring the correction information 11H from the information processing apparatus 10B of the mobile body 100B that has observed the own vehicle, the information processing apparatus 10A on the observed side corrects the self-position of the own vehicle based on the correction information 11H. Consequently, the information processing system 1 can move the mobile body 100A of the information processing apparatus 10A to be observed from the mobile body 100B and correct the self-position of the mobile body 100A with the information processing apparatus 10A based on relative positions of the mobile body 100B and the own vehicle. As a result, the information processing system 1 can support correction of estimated self-positions among the information processing apparatuses 10 mounted on the respective plurality of mobile bodies 100. Therefore, a system configuration can be simplified without using an observation configuration.

In the information processing system 1, the information processing apparatus 10B on the observing side moves the mobile body 100B to be capable of observing the mobile body 100A. Consequently, the information processing system 1 can improve a probability of the mobile body 100A on the observed side and the mobile body 100B on the observed side encountering each other. Therefore, self-positions of the plurality of mobile bodies 100 can be quickly corrected.

[Example of Another Operation of the Information Processing System According to the Embodiment]

Figure 13:
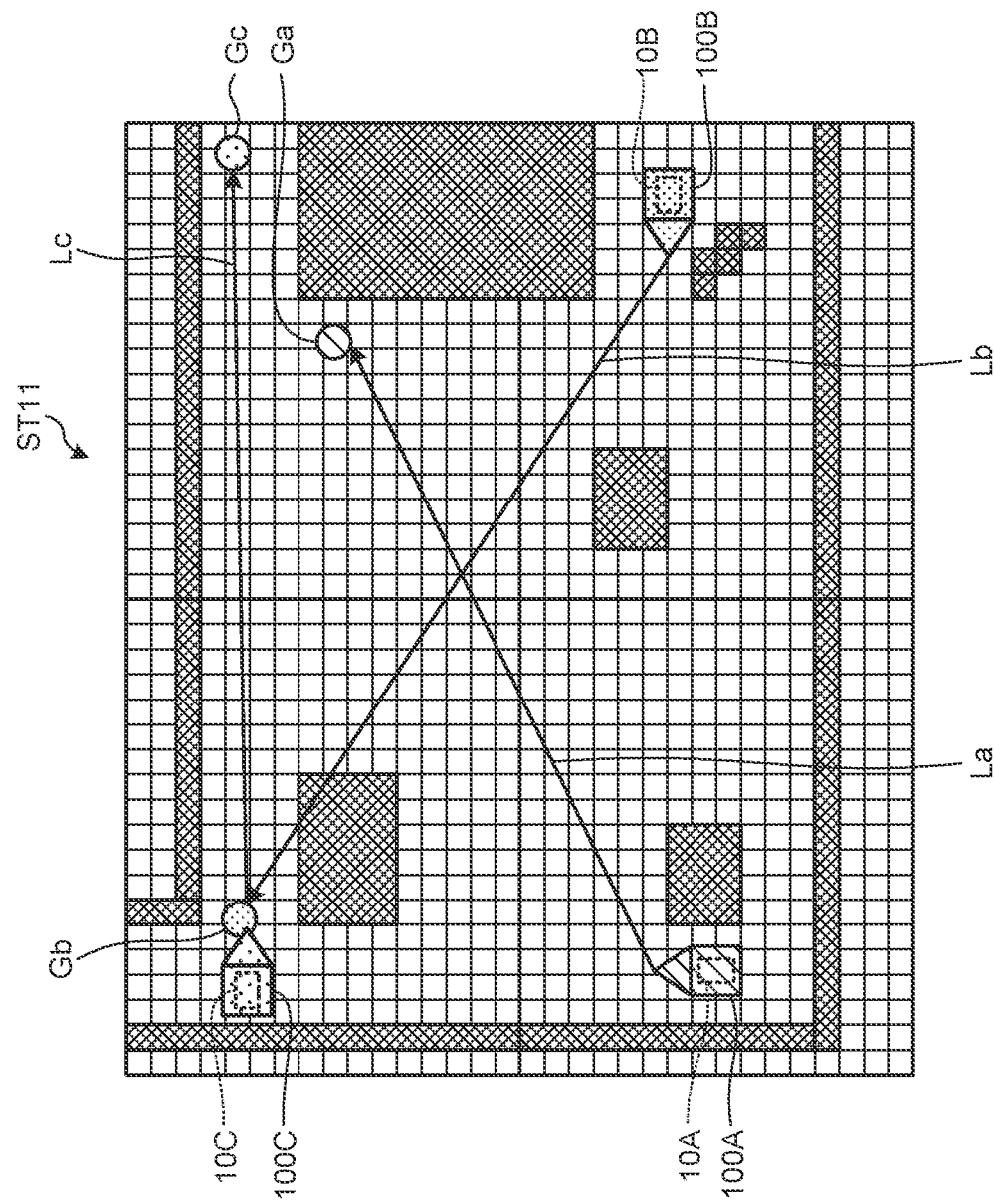
FIG. 13 is a diagram for explaining an example of another operation of the information processing system according to the embodiment.
Figure 14:
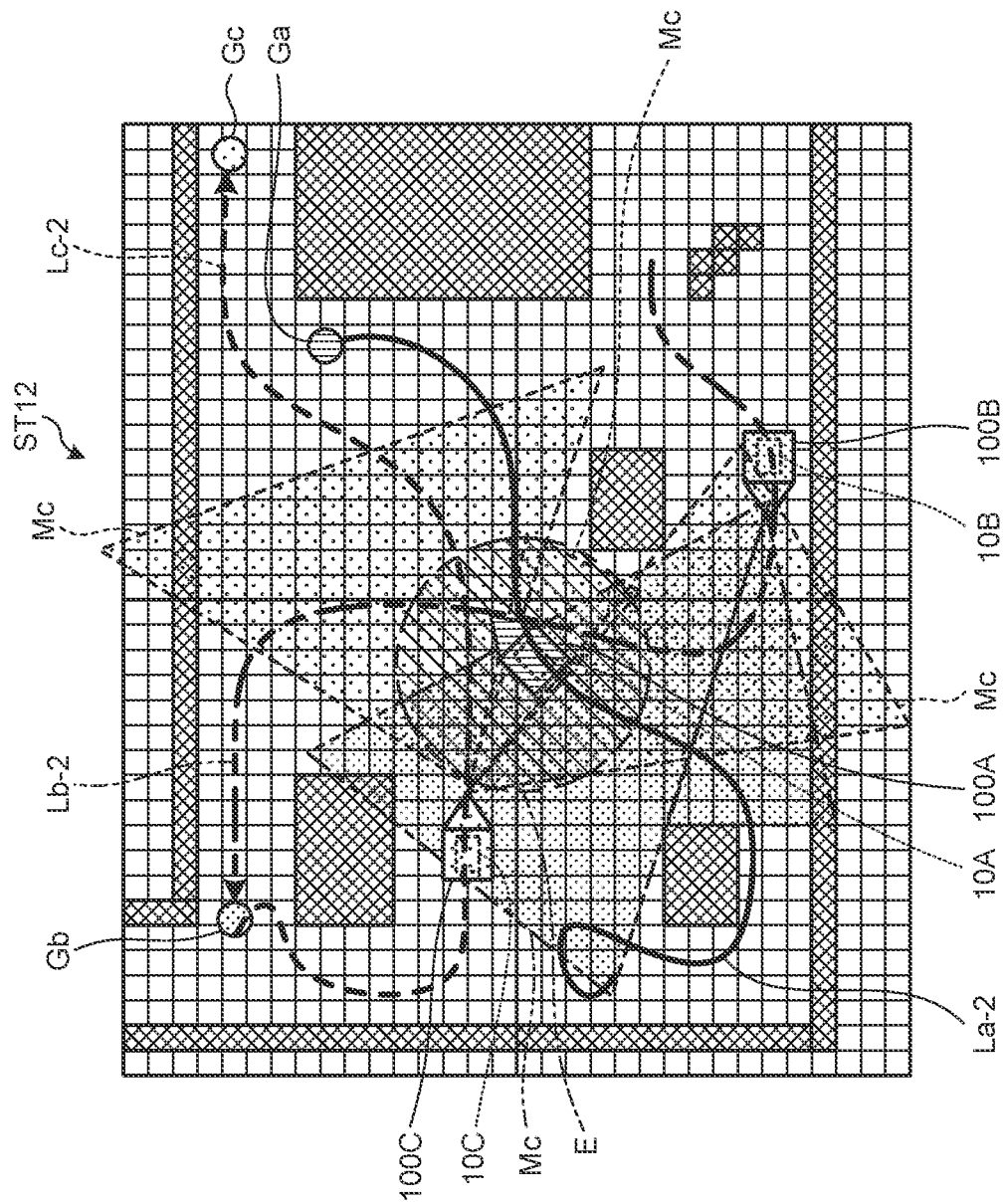
FIG. 14 is a diagram for explaining an example of another operation of the information processing system according to the embodiment.

FIG. 13 and FIG. 14 are diagrams for explaining an example of another operation of the information processing system 1 according to the embodiment.

In a scene ST11 at time t3 illustrated in FIG. 13, the information processing system 1 includes the information processing apparatus 10A mounted on the mobile body 100A, the information processing apparatus 10B mounted on the mobile body 100B, and the information processing apparatus 10B mounted on the mobile body 100C. The information processing apparatus 10A plans a route La toward a target position Ga, and controls the movement of the mobile body 100A to move along the route La. The information processing apparatus 10B of the mobile body 100B plans the route Lb toward the target position Gb and controls the movement of the mobile body 100B to move along the route Lb. The information processing apparatus 10B of the mobile body 100C plans the route Lc toward the target position Gc and controls the movement of the mobile body 100C to move along the route Lc.

Thereafter, the validity of an estimated self-position of the information processing apparatus 10A has decreased and the information processing apparatus 10A is functioning as an observed side apparatus. The validity of estimated self-positions of the information processing apparatuses 10B of the mobile body 100B and the mobile body 100C has not decreased and the information processing apparatuses 10B are functioning as observing side apparatuses.

In this case, the information processing apparatus 10A on the observed side generates the observation target information 11C indicating a probability of the own vehicle being observed from the peripheral mobile body 100B and the mobile body 100C. The information processing apparatus 10A changes the route La to move, based on the observation target information 11C, the own vehicle to a position where the peripheral mobile body 100B and the peripheral mobile body 100C are capable of observing the own vehicle. The information processing apparatus 10A transmits an observation request to the information processing apparatus 10B of each of the peripheral mobile body 100B and the mobile body 100C via the communication unit 120.

When receiving the observation request from the information processing apparatus 10A via the communication unit 120, the information processing apparatus 10B on the observing side generates observation information 10D indicating a probability of observing the mobile body 100A on which the information processing apparatus 10A is mounted. The information processing apparatus 10B of the mobile body 100B changes, based on the observation information 10D, the route Lb to move the own vehicle to a position where the own vehicle is capable of observing the observation target mobile body 100A. The information processing apparatus 10B of the mobile body 100C changes, based on the observation information 10D, the route Lc to move the own vehicle to a position where the own vehicle is capable of observing the observation target mobile body 100A. The information processing apparatuses 10B of the mobile body 100B and the mobile body 100C start observation of the peripheral mobile body 100.

Thereafter, in a scene ST12 at time t4 illustrated in FIG. 14, the information processing apparatus 10A on the observed side moves toward the target position Ga and along the changed route La-2 on which the mobile body 100B is capable of observing the own vehicle. The information processing apparatus 10B of the mobile body 100B on the observing side observes the peripheral mobile body 100 while moving toward the target position Gb and along the changed route Lb-2 capable of observing the observation target mobile body 100A. The information processing apparatus 10B of the mobile body 100C on the observing side observes the peripheral mobile body 100 while moving toward the target position Gc and along the changed route Lc-2 capable of observing the observation target mobile body 100A.

In the scene ST12, the mobile body 100A on the observed side is observed from both the mobile body 100B and the mobile body 100C. In this case, when observing the target mobile body 100A, the information processing apparatuses 10B of the mobile body 100B and the mobile body 100C generate the correction information 11H capable of specifying relative positions of the observed mobile body 100A and the own vehicle and provide the correction information 11H to the information processing apparatus 10A of the mobile body 100A.

When acquiring the correction information 11H from the information processing apparatuses 10B of the mobile body 100B and the mobile body 100C that have observed the own vehicle, the information processing apparatus 10A on the observed side corrects the self-position of the own vehicle based on the respective kinds of correction information 11H. The information processing apparatus 10A corrects the self-position of the own vehicle based on the self-positions of the mobile body 100B and the mobile body 100C. Consequently, the information processing system 1 can move the mobile body 100A of the information processing apparatus 10A to be observed from the mobile body 100B and the mobile body 100C and correct the self-position of the mobile body 100A with the information processing apparatus 10A based on the relative positions of the mobile body 100B and the mobile body 100C and the own vehicle. As a result, the information processing system 1 can support correction of estimated self-positions among the information processing apparatuses 10 mounted on the respective plurality of mobile bodies 100. Therefore, a system configuration can be simplified without using an observation configuration.

In the information processing system 1, the information processing apparatus 10B on the observing side moves the mobile body 100B to be capable of observing the mobile body 100A. Consequently, the information processing system 1 can improve a probability of the mobile body 100A on the observed side and the mobile body 100B on the observed side encountering each other. Therefore, self-positions of the plurality of mobile bodies 100 can be quickly corrected.

[Modification (1) of the Embodiment]

For example, in the embodiment, the case in which the information processing apparatus 10B on the observing side moves the own vehicle toward the observation target mobile body 100A is explained. However, the present disclosure is not limited to this. For example, the information processing apparatus 10B can be configured to provide the correction information 11H without moving the own vehicle toward the observation target mobile body 100A. Note that the information processing apparatus 10A on the observed side is assumed to be the same as the embodiment.

[Processing Procedure of the Information Processing Apparatus on the Observing Side According to the Modification (1) of Embodiment]

Figure 15:
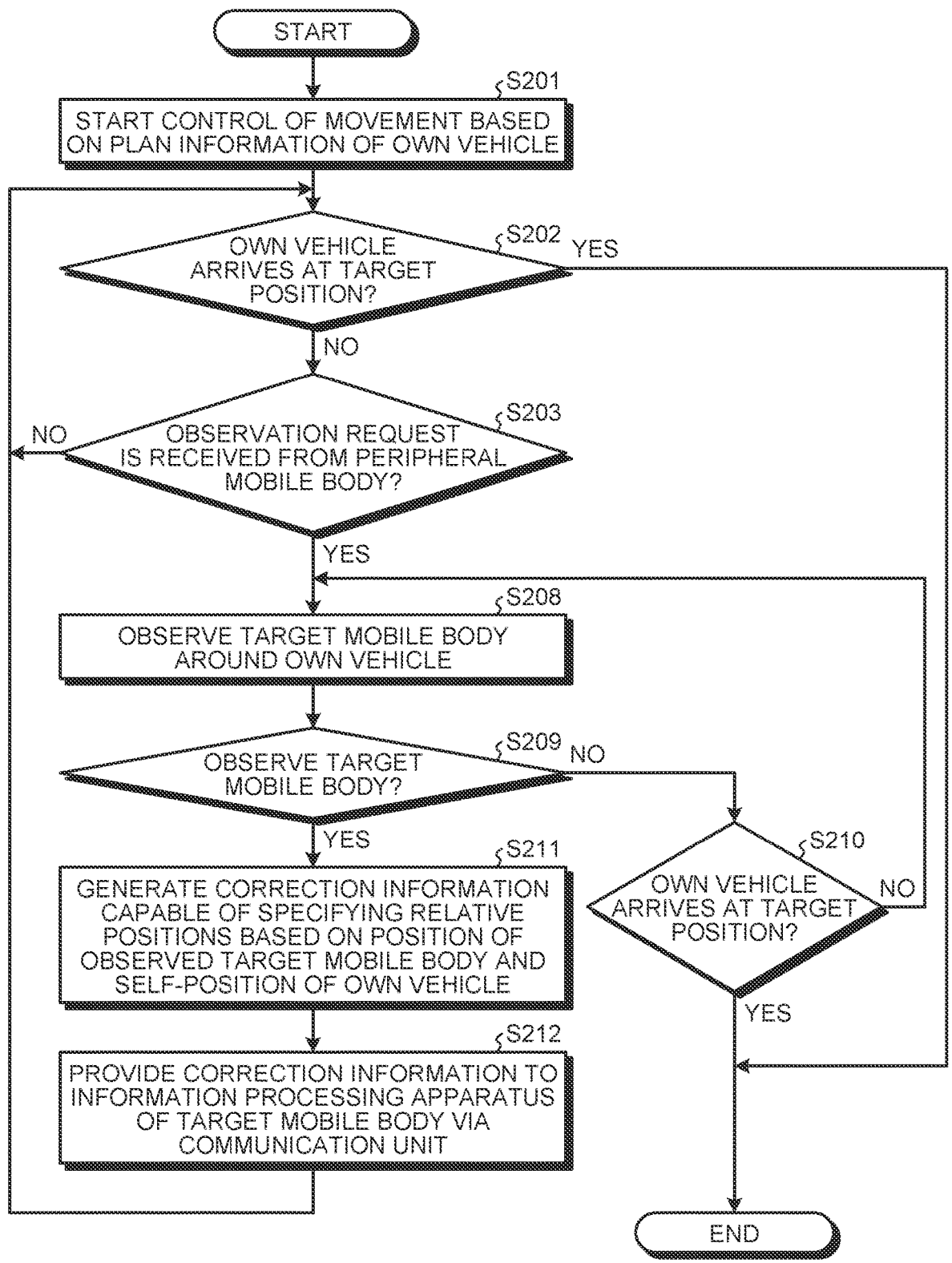
FIG. 15 is a flowchart illustrating an example of a processing procedure executed by an information processing apparatus on an observing side according to a modification (1) of the embodiment.

FIG. 15 is a flowchart illustrating an example of a processing procedure executed by the information processing apparatus 10 on the observing side according to the modification (1) of the embodiment. The processing procedure illustrated in FIG. 15 is realized by the control unit 12 of the information processing apparatus 10B on the observing side executing a program. The processing procedure illustrated in FIG. 15 is repeatedly executed by the control unit 12 on the observing side.

As illustrated in FIG. 15, the control unit 12 of the information processing apparatus 10B starts control of movement based on the plan information 11E of the own vehicle (step S201). The control unit 12 determines whether the own vehicle has arrived at the target position (step S202). When determining that the own vehicle has arrived at the target position (Yes in step S202), the control unit 12 ends the processing procedure illustrated in FIG. 15. When determining that the own vehicle has not arrived at the target position (No in step S202), since the own vehicle is moving, the control unit 12 advances the processing to step S203.

The control unit 12 determines whether an observation request is received from the peripheral mobile body 100 via the communication unit 120 (step S203). When determining that the observation request is not received from the peripheral mobile body 100 (No in step S203), the control unit 12 returns the processing to step S202 explained above. In addition, when determining that the observation request is received from the peripheral mobile body 100 (Yes in step S203), the control unit 12 advances the processing to step S208.

The control unit 12 observes the target mobile body 100 around the own vehicle (step S208). The control unit 12 determines, based on the observation result in step S208, whether the target mobile body 100 is detected (step S209). When determining that the target mobile body 100 is not observed (No in step S209), the control unit 12 advances the processing to step S210.

The control unit 12 determines whether the own vehicle has arrived at the target position (step S210). When determining that the own vehicle has not arrived at the target position (No in step S210), since the own vehicle is moving, the control unit 12 returns the processing to step S208 explained above and continues the processing. When determining that the own vehicle has arrived at the target position (Yes in step S210), the control unit 12 ends the processing procedure illustrated in FIG. 15.

Furthermore, when determining that the target mobile body 100 is observed (Yes in step S209), the control unit 12 advances the processing to step S211. The control unit 12 generates, based on the position of the observed target mobile body 100 and the self-position of the own vehicle, the correction information 11H capable of specifying relative positions (step S211). The control unit 12 provides the correction information 11H to the information processing apparatus 10A of the target mobile body 100 via the communication unit 120 (step S212). When the processing in step S212 ends, the control unit 12 ends the processing procedure illustrated in FIG. 15 in a state in which the control of the movement of the own vehicle is continued.

[Example of an Operation of Information Processing System According to the Modification (1) of the Embodiment]

Figure 16:
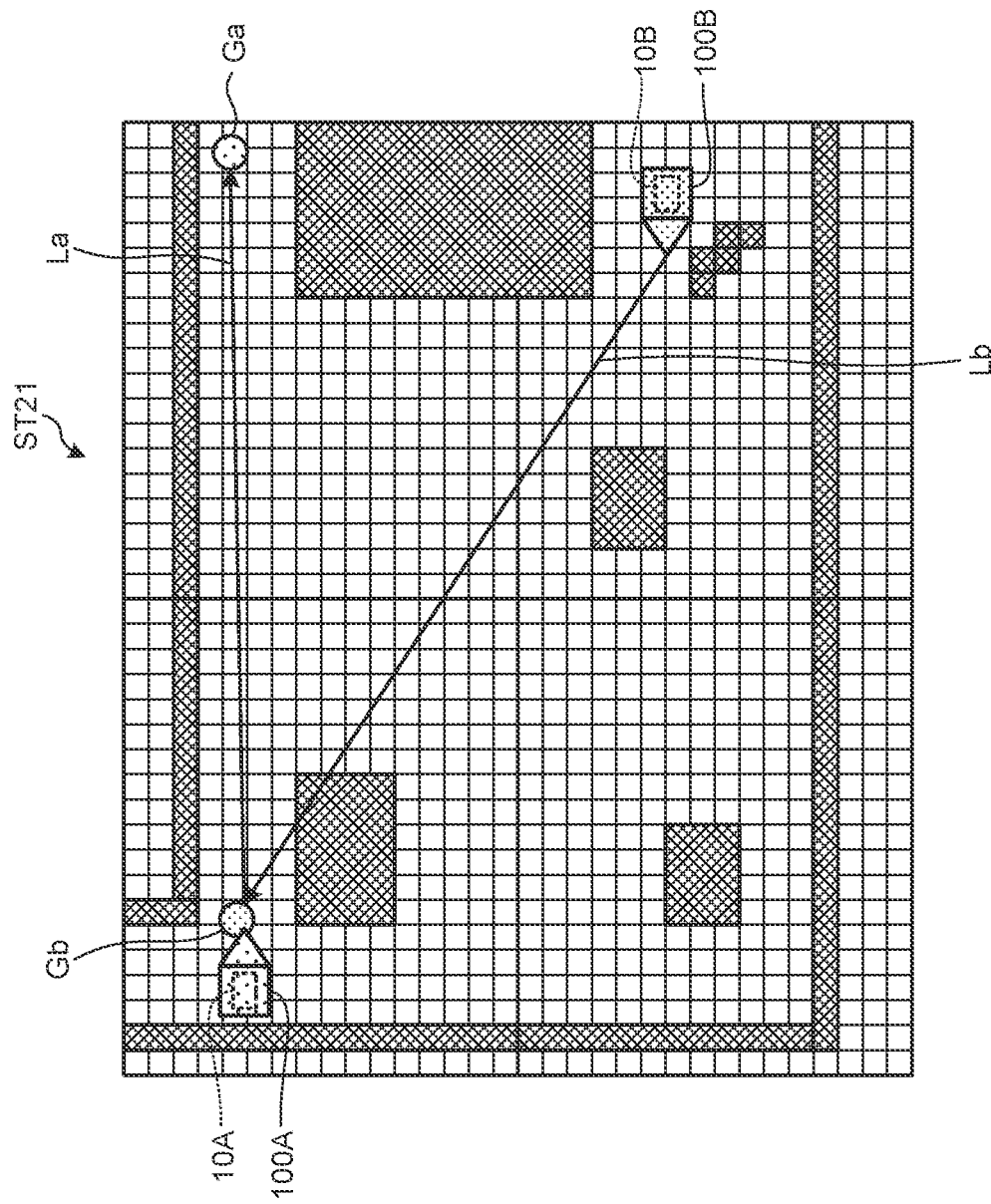
FIG. 16 is a diagram for explaining an example of an operation of an information processing system according to the modification (1) of the embodiment.
Figure 17:
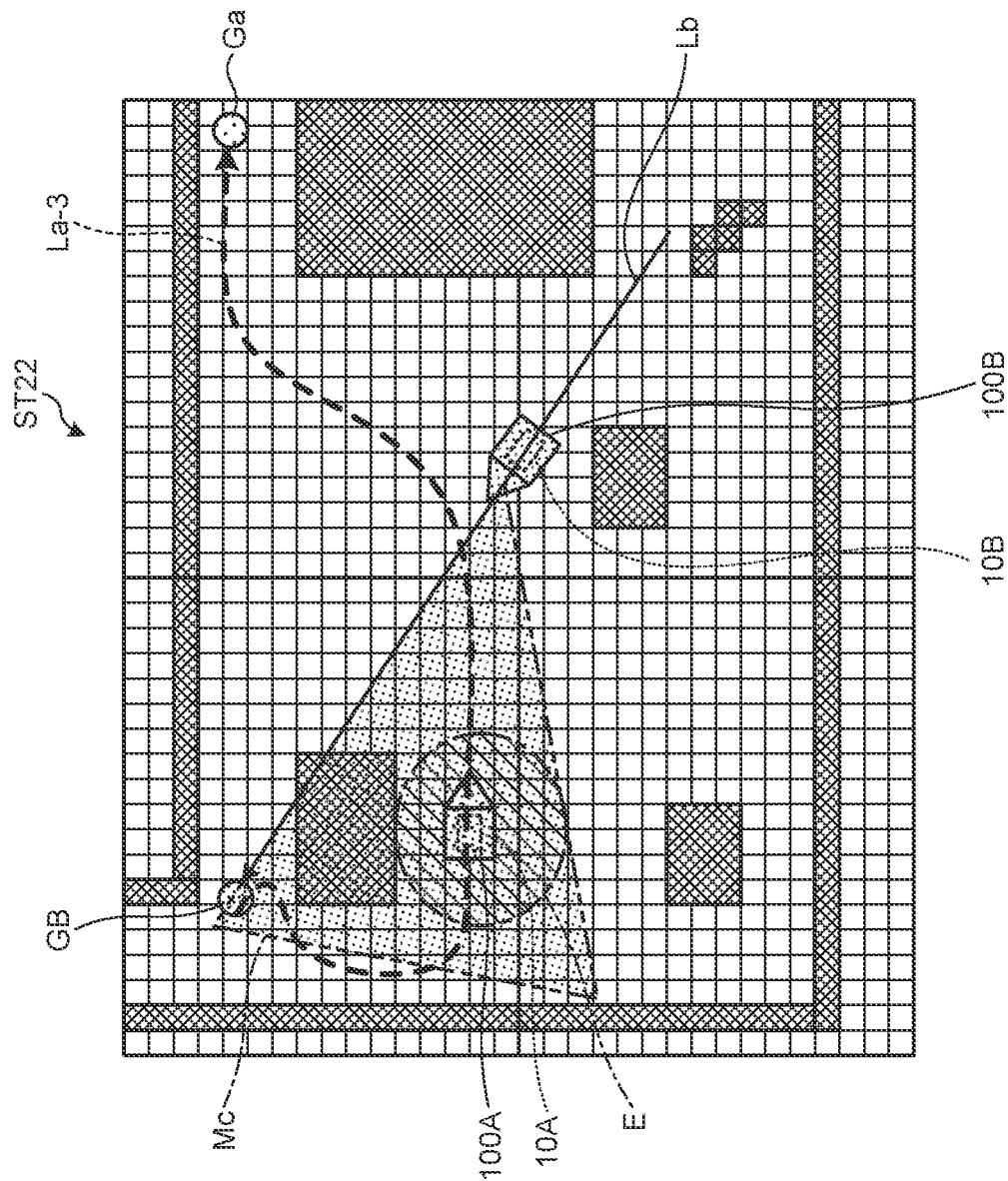
FIG. 17 is a diagram for explaining an example of an operation of the information processing system according to the modification (1) of the embodiment.

FIG. 16 and FIG. 17 are diagrams for explaining an example of the operation of the information processing system 1 according to the modification (1) of the embodiment.

In a scene ST21 at time t5 illustrated in FIG. 16, the information processing system 1 includes the information processing apparatus 10A mounted on the mobile body 100A and the information processing apparatus 10B mounted on the mobile body 100B. The information processing apparatus 10A plans a route La toward a target position Ga, and controls the movement of the mobile body 100A to move along the route La. The information processing apparatus 10B plans the route Lb toward the target position Gb and controls the movement of the mobile body 100B such that the mobile body 100B moves along the route Lb. Thereafter, the validity of an estimated self-position of the information processing apparatus 10A has decreased and the information processing apparatus 10A is functioning as an observed side apparatus. The validity of an estimated self-position of the information processing apparatus 10B has not decreased and the information processing apparatus 10B is functioning as an observing side apparatus.

In this case, the information processing apparatus 10A on the observed side generates the observation target information 11C indicating a probability of the own vehicle being observed from the peripheral mobile body 100B. The information processing apparatus 10A changes the route La based on the observation target information 11C to move the own vehicle to a position where the peripheral mobile body 100B is capable of observing the own vehicle. The information processing apparatus 10A transmits an observation request to the peripheral information processing apparatus 10B via the communication unit 120.

When receiving the observation request from the information processing apparatus 10A via the communication unit 120, the information processing apparatus 10B on the observing side, in a state in which the information processing apparatus 10B moves along the route Lb, starts observation of the peripheral mobile body 100 without changing the route Lb along which the information processing apparatus 10B moves.

Thereafter, in a scene ST22 at time t6 illustrated in FIG. 17, the information processing apparatus 10A on the observed side moves toward the target position Ga and along the changed route La-3 on which the mobile body 100B is capable of observing the own vehicle. The information processing apparatus 10B on the observing side observes the peripheral mobile body 100 while moving along the route Lb. Then, after observing the target mobile body 100A, the information processing apparatus 10B generates the correction information 11H capable of specifying relative positions of the observed mobile body 100A and the mobile body 100B, and provides the correction information 11H to the information processing apparatus 10A of the mobile body 100A.

When acquiring the correction information 11H from the information processing apparatus 10B of the mobile body 100B that has observed the own vehicle, the information processing apparatus 10A on the observed side corrects the self-position of the own vehicle based on the correction information 11H. Consequently, the information processing system 1 can move the mobile body 100A of the information processing apparatus 10A to be observed from the mobile body 100B and correct the self-position of the mobile body 100A with the information processing apparatus 10A based on relative positions of the mobile body 100B and the own vehicle. As a result, the information processing system 1 can support correction of estimated self-positions among the information processing apparatuses 10 mounted on the respective plurality of mobile bodies 100. Therefore, a system configuration can be simplified without using an observation configuration.

The information processing system 1 can provide, to the information processing apparatus 10A, the correction information 11H based on an observation result of the mobile body 100A without the information processing apparatus 10B on the observing side changing a movement plan of the mobile body 100B. As a result, the information processing system 1 can suppress an increase in the burden on the mobile body 100B on the observing side and improve the probability of the mobile body 100A on the observing side and the mobile body 100B on the observing side encountering each other. Therefore, the self-positions of the plurality of mobile bodies 100 can be quickly corrected.

[Modification (2) of the Embodiment]

In the present embodiment, the case in which the information processing system 1 includes the information processing apparatus 10A and the information processing apparatus 10B in order to distinguish the observed side apparatus and the observing side apparatus is explained. However, the present disclosure is not limited this. For example, in the information processing system 1, the observed apparatus and the observing side apparatus can be components of the same information processing apparatus 10.

Figure 18:
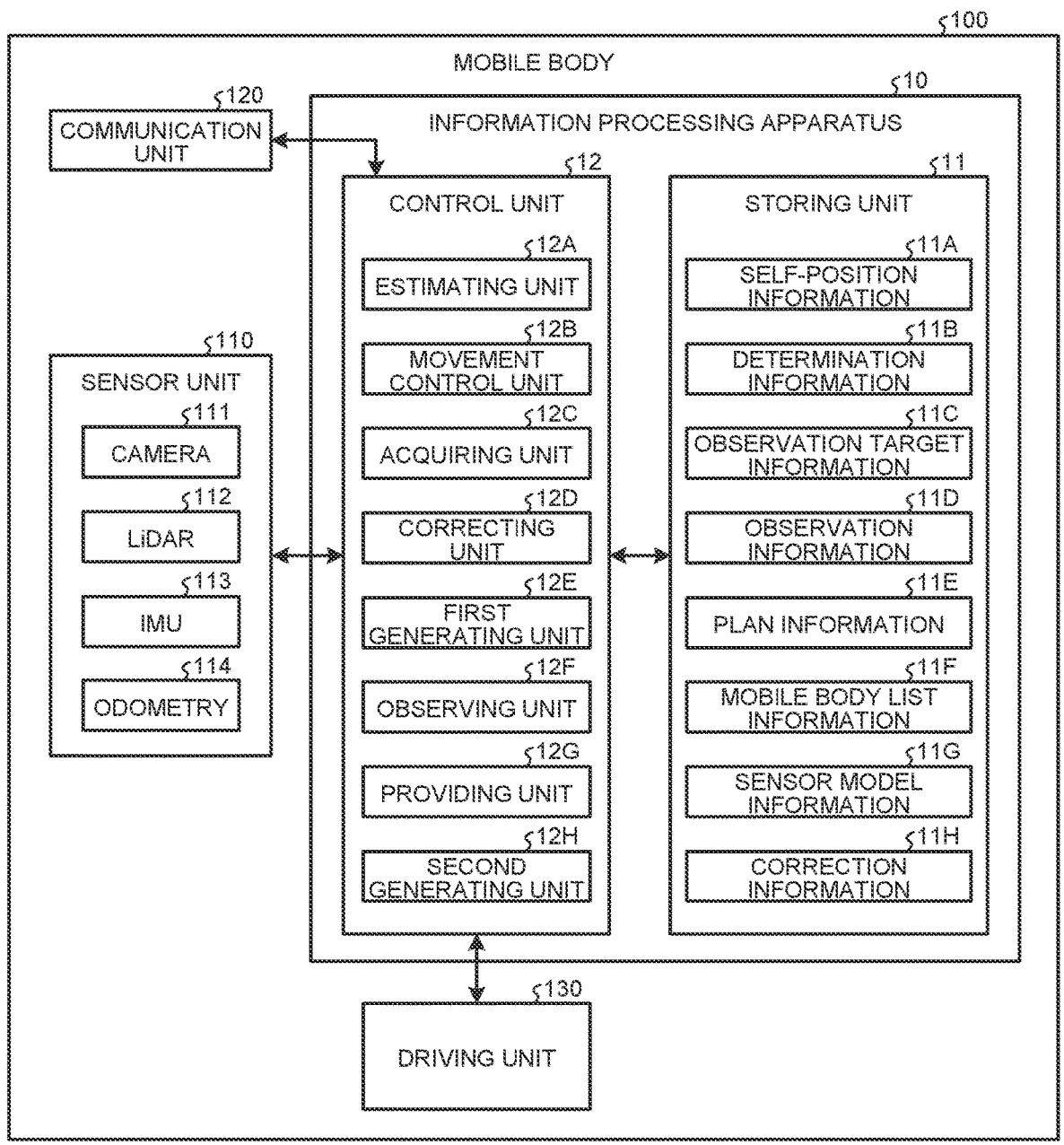
FIG. 18 is a diagram for explaining an example of an information processing apparatus according to a modification (2) of the embodiment.

FIG. 18 is a diagram for explaining an example of the information processing apparatus 10 according to a modification (2) of the embodiment. As illustrated in FIG. 18, the mobile body 100 includes the sensor unit 110, the communication unit 120, the driving unit 130, and the information processing apparatus 10 (10A). The sensor unit 110, the communication unit 120, the driving unit 130, and the information processing apparatus 10A are connected to be capable of exchanging data and signals.

The information processing apparatus 10 includes the storing unit 11 and the control unit 12. The storing unit 11 and the control unit 12 are connected to be capable of exchanging data and information. The control unit 12 includes functional units such as the estimating unit 12A, the movement control unit 12B, the acquiring unit 12C, the correcting unit 12D, the first generating unit 12E, the observing unit 12F, the providing unit 12G, and the second generating unit 12H. That is, the information processing apparatus 10 may be configured to operate as an observed side apparatus when an estimated self-position is invalid and operate as an observing side apparatus when the estimated self-position is valid.

The modification (1) and the modification (2) of the embodiment explained above are examples. Various changes and applications are possible.

[Hardware Configuration]

Figure 19:
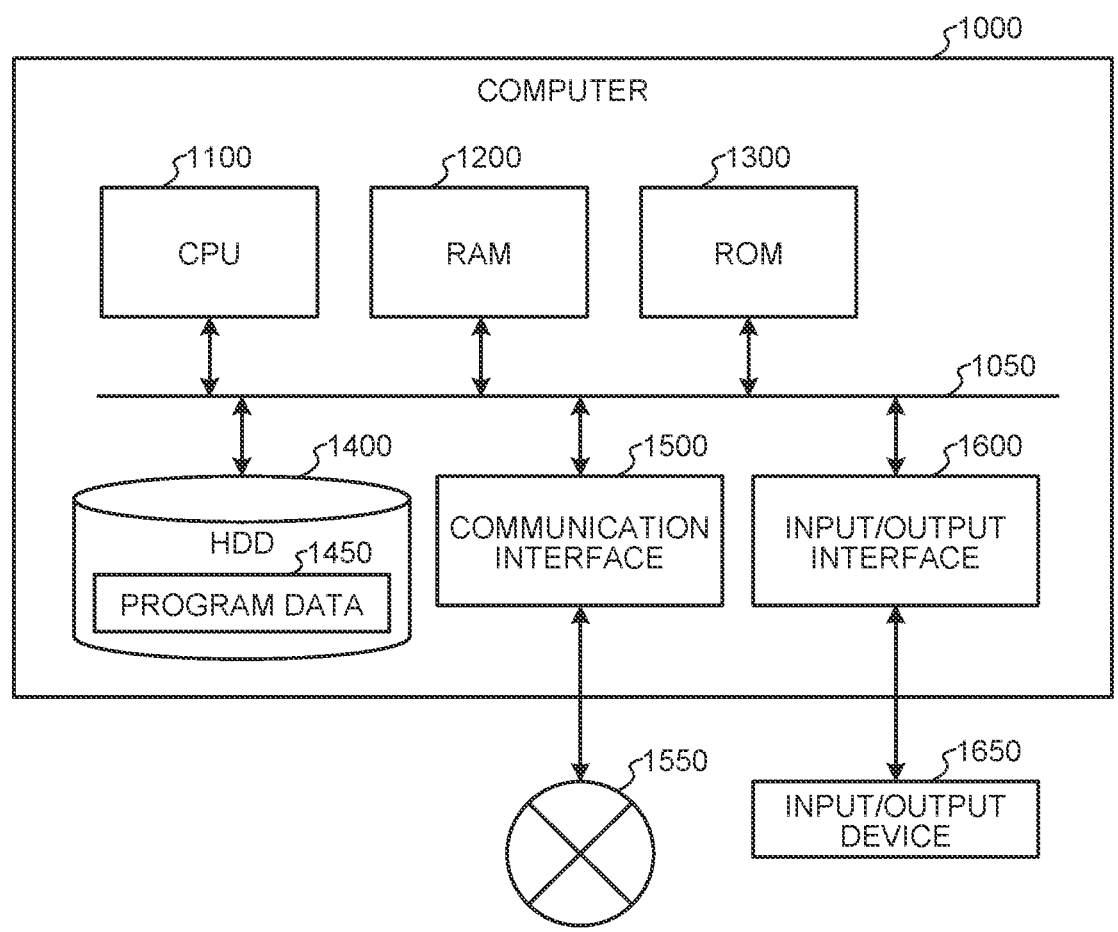
FIG. 19 is a hardware configuration diagram illustrating an example of a computer that realizes functions of an information processing apparatus.

The information processing apparatus 10 according to the embodiment explained above may be realized by, for example, a computer 1000 having a configuration illustrated in FIG. 19. In the following explanation, the information processing apparatus 10 according to the embodiment is explained as an example. FIG. 19 is a hardware configuration diagram illustrating an example of the computer 1000 that realizes the functions of the information processing apparatus 10. The computer 1000 includes a CPU 1100, a RAM 1200, a read only memory (ROM) 1300, a hard disk drive (HDD) 1400, a communication interface 1500, and an input/output interface 1600. The units of the computer 1000 are connected by a bus 1050.

The CPU 1100 operates based on a program stored in the ROM 1300 or the HDD 1400 and controls the units. For example, the CPU 1100 develops a program stored in the ROM 1300 or the HDD 1400 in the RAM 1200 and executes processing corresponding to various programs.

The ROM 1300 stores a boot program such as a basic input output system (BIOS) to be executed by the CPU 1100 when the computer 1000 is started, a program relying on hardware of the computer 1000, and the like.

The HDD 1400 is a computer-readable recording medium that non-transiently records a program to be executed by the CPU 1100, data used by the program, and the like. Specifically, the HDD 1400 is a recording medium that records an information processing program according to the present disclosure, which is an example of program data 1450.

The communication interface 1500 is an interface for the computer 1000 to be connected to an external network 1550 (for example, the Internet). For example, the CPU 1100 receives data from other equipment or transmits data generated by the CPU 1100 to the other equipment via the communication interface 1500.

The input/output interface 1600 is an interface for connecting an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (a medium). The medium is, for example, an optical recording medium such as a digital versatile disc (DVD), a magneto-optical recording medium such as a magneto-optical disk (MO), a tape medium, a magnetic recording medium, or a semiconductor memory.

For example, when the computer 1000 functions as the information processing apparatus 10 according to the embodiment, the CPU 1100 of the computer 1000 executes a program loaded on the RAM 1200 to realize the functions of the estimating unit 12A, the movement control unit 12B, the acquiring unit 12C, the correcting unit 12D, the first generating unit 12E, the observing unit 12F, the providing unit 12G, the second generating unit 12H, and the like. In addition, the HDD 1400 stores a program according to the present disclosure and data in the storing unit 11. Note that the CPU 1100 reads the program data 1450 from the HDD 1400 and executes the program data 1450. However, as another example, the CPU 1100 may acquire these programs from other devices via the external network 1550.

The preferred embodiment of the present disclosure is explained in detail above with reference to the accompanying drawings. However, the technical scope of the present disclosure is not limited to such an example. It is evident that those having the ordinary knowledge in the technical field of the present disclosure can arrive at various alterations or corrections within the category of the technical idea described in claims. It is understood that these alterations and corrections naturally belong to the technical scope of the present disclosure.

The effects explained in this specification are only explanatory or illustrative and are not limiting. That is, the technique according to the present disclosure can achieve other effects obvious to those skilled in the art from the description of this specification together with the effects or instead of the effects.

Furthermore, it is also possible to create a program for causing hardware such as a CPU, a ROM, and a RAM incorporated in a computer to exert functions equivalent to the components of the information processing apparatus 10 and a computer-readable recording medium recording the program can also be provided.

Furthermore, the steps relating to the processing of the information processing apparatus 10 of the present specification do not always need to be processed in time series according to the order explained in the flowcharts. For example, the steps relating to the processing of the information processing apparatus 10 may be processed in order different from the order described in the flowcharts or may be processed in parallel.

(Effects)

The information processing system 1 includes the information processing apparatus (the first information processing apparatus) 100A that estimates a self-position of the mobile body (the first mobile body) 10A and the information processing apparatus (the second information processing apparatus) 100B that estimates a self-position of the mobile body (the second mobile body) 10B. The information processing apparatus 10A includes the movement control unit 12B that performs control for moving, based on the observation target information 11C indicating a probability of the mobile body 100A being observed from the mobile body 100B, the mobile body 100A to a position where the mobile body 100B is capable of observing the mobile body 100A, the acquiring unit 12C that acquires the correction information 11H capable of specifying relative positions of the mobile body 100A and the mobile body 100B from the mobile body 100B that has observed the mobile body 100A, and the correcting unit 12D that corrects the self-position of the mobile body 100A based on the correction information 11H. The information processing apparatus 10B includes the observing unit 12F that observes the mobile body 100A around the mobile body 100B, and the providing unit 12G that provides correction information 11H capable of specifying relative positions of the observed mobile body 100A and the mobile body 100B to the information processing apparatus 10A of the mobile body 100A.

Consequently, in the information processing system 1, the information processing apparatus 10A moves, based on the observation target information 11C indicating a probability of the mobile body 100A being observed from the mobile body 100B, the mobile body 100A to a position where the mobile body 100B is capable of observing the mobile body 100A. The information processing apparatus 10A can correct the self-position of the mobile body 100A based on the correction information 11H acquired from the mobile body 100B that has observed the mobile body 100A. Furthermore, after observing the mobile body 100A around the mobile body 100B, the information processing apparatus 10B can provide the correction information 11H capable of specifying relative positions of the observed mobile body 100A and the mobile body 100B to the information processing apparatus 10A of the mobile body 100A. As a result, in the information processing system 1, the information processing apparatus 10A moves the mobile body 100A to a position where the mobile body 100B is capable of observing the mobile body 100A. Therefore, the information processing apparatuses 10 mounted on the plurality of mobile bodies 100 can support correction of the self-positions of the other mobile bodies 100 one another.

The information processing apparatus 10A of the information processing system 1 further includes the first generating unit 12E that generates observation target information 11C indicating a relation between a probability of the mobile body 100A being observed from the mobile body 100B and the position of the mobile body 100A based on a movement plan of the mobile body 100B. The movement control unit 12B performs control for moving, based on the generated observation target information 11C, the mobile body 100A to a position where the mobile body 100B is capable of observing the mobile body 100A.

Consequently, in the information processing system 1, the information processing apparatus 10A can generate the observation target information 11C based on the movement plan of the peripheral mobile body 100B and move, based on the observation target information 11C, the mobile body 100A to a position where the mobile body 100B is capable of observing the mobile body 100A. As a result, in the information processing system 1, the information processing apparatus 10A moves the mobile body 100A based on the movement plan of the mobile body 100B, whereby a probability of the mobile body 100B observing the mobile body 100A can be improved. Furthermore, in the information processing system 1, since the information processing apparatus 10B on the observing side does not need to consider the position of the mobile body 100 on the observed side, it is possible to suppress a load concerning correction of a self-position.

In the information processing system 1, the observation target information 11C is information indicating, in time series, information indicating a relation between the probability of the mobile body 100A being observed from the mobile body 100B and the position of the mobile body 100A.

Consequently, the information processing system 1 can move, based on the time-series relation between the probability and the position indicated by the observation target information 11C, the mobile body 100A to a position where the mobile body 100B is capable of observing the mobile body 100A. As a result, the information processing system 1 can further improve the probability of the mobile body 100B observing the mobile body 100A. Therefore, the self-position of the mobile body 100A can be quickly corrected.

In the information processing system 1, the observation target information 11C includes information indicating a probability of the mobile body 100A being observed from each of the plurality of mobile bodies 100B.

Consequently, the information processing system 1 can move, based on the probability of the mobile body 100A being observed from each of the plurality of mobile bodies 100B, the mobile body 100A to a position where the mobile body 100B is capable of observing the mobile body 100A. As a result, the information processing system 1 can further improve the probability of the mobile body 100A being observed from the mobile body 100B. Therefore, the self-position of the mobile body 100A can be quickly corrected.

In the information processing system 1, the movement control unit 12B of the information processing apparatus 10A performs control for moving, based on a target position of the mobile body 100A and the observation target information 11C, the mobile body 100A to a position where the mobile body 100B is capable of observing the mobile body 100A.

Consequently, the information processing system 1 can move, based on the target position of the mobile body 100A and a probability of the information processing apparatus 10A being observed from the peripheral mobile body 100B, the mobile body 100A to a position where the mobile body 100B is capable of observing the mobile body 100A. As a result, the information processing system 1 can move the mobile body 100A to a position where the mobile body 100A is easily observed from the mobile body 100B on the observing side while moving the mobile body 100A toward the target position. Therefore, it is possible to correct the self-position by suppressing a decrease in efficiency of the mobile body 100A on the observed side.

In the information processing system 1, the movement control unit 12B of the information processing apparatus 10A does not perform, when it is determined that the self-position of the mobile body 100A is valid, control for moving the mobile body 100A to a position where the mobile body 100B is capable of observing the mobile body 100A and performs, when it is determined that the self-position of the mobile body 100A is invalid, control for moving the mobile body 100A to a position where the mobile body 100B is capable of observing the mobile body 100A.

Consequently, the information processing system 1 does not move, when the self-position of the mobile body 100A is valid, the mobile body 100A to a position where the mobile body 100B is capable of observing the mobile body 100A and can move, when the self-position of the mobile body 100A is invalid, the mobile body 100A to a position where the mobile body 100B is capable of observing the mobile body 100A. As a result, when the self-position of the mobile body 100A is invalid, the information processing system 1 can move the mobile body 100 to a position where the mobile body 100A is easily observed from the mobile body 100B on the observing side. Therefore, it is possible to correct the self-position by suppressing a decrease in movement efficiency of the mobile body 100 on the observed side.

In the information processing system 1, the information processing apparatus 10B on the observing side further includes the second generating unit 12H that generates the observation information 11D indicating a probability of observing the mobile body 100A around the mobile body 100B, and the movement control unit 12B that performs control for moving, based on the observation information 11D, the second mobile body to a position where the second mobile body is capable of observing the mobile body 100A.

Consequently, the information processing system 1 can generate the observation information 11D indicating the probability of observing the mobile body 100A around the mobile body 100B and move, based on the observation information 11D, the mobile body 100B to a position where the mobile body 100B is capable of observing the mobile body 100A. As a result, the information processing system 1 can improve the probability of the mobile body 100B observing the mobile body 100A by the information processing apparatus 10B moving the mobile body 100B based on the observation probability. Furthermore, since the information processing system 1 does not need to change a moving route of the information processing apparatus 10A on the observed side, it is possible to suppress a load concerning correction of a self-position.

In the information processing system 1, the observation information 11D is information indicating a relation among the probability of observing the mobile body 100A around the mobile body 100B, the position of the mobile body 100A, and a map in time series.

Consequently, the information processing system 1 can move, based on the time-series relation between the probability and the position indicated by the observation information 11D, the mobile body 100B to a position where the mobile body 100B is capable of observing the mobile body 100A. As a result, the information processing system 1 can further improve the probability of the mobile body 100B observing the mobile body 100A. Therefore, the self-position of the mobile body 100A can be quickly corrected.

In the information processing system 1, the movement control unit 12B of the information processing apparatus 10B performs control for moving, based on the target position of the mobile body 100B and the observation information 11D, the mobile body 100B to a position where the mobile body 100B is capable of observing the mobile body 100A.

Consequently, the information processing system 1 can move, based on the target position of the mobile body 100B and the probability of the information processing apparatus 10B observing the mobile body 100A, the mobile body 100B to a position where the mobile body 100B is capable of observing the mobile body 100A. As a result, the information processing system 1 can move the mobile body 100B to a position where the mobile body 100B can easily observe the mobile body 100A on the observed side while moving the mobile body 100B toward the target position. Therefore, it is possible to suppress a decrease in efficiency of the mobile body 100B on the observing side and support correction of a self-position.

In the information processing system 1, the movement control unit 12B of the information processing apparatus 10B performs, when the observation request from the mobile body 100A is acquired, control for moving the mobile body 100B to a position where the mobile body 100B is capable of observing the mobile body 100A and does not perform, when the observation request from the mobile body 100A is not acquired, control for moving the mobile body 100B to a position where the mobile body 100B is capable of observing the mobile body 100A.

Consequently, the information processing system 1 does not move, when the observation request from the mobile body 100A is not acquired, the mobile body 100B to a position where the mobile body 100B is capable of observing the mobile body 100A and can move, when the observation request from the mobile body 100A is not acquired, the mobile body 100B to a position where the mobile body 100B is capable of observing the mobile body 100A. As a result, when the observation request is acquired from the mobile body 100A, the information processing system 1 can move the mobile body 100B on the observing side to a position where the mobile body 100A is capable of observing the mobile body 100B. Therefore, it is possible to suppress a decrease in the movement efficiency of the mobile body 100B on the observing side and support correction of a self-position.

The information processing apparatus 10A includes the estimating unit 12A that estimates a self-position of a mobile body 100A on which the own apparatus is mounted, the movement control unit 12B that performs control for moving, based on the observation target information 11C indicating a probability of the mobile body 100A being observed from the mobile body 100B, the mobile body 100A to a position where the mobile body 100B is capable of observing the mobile body 100A, the acquiring unit 12C that acquires the correction information 11H capable of specifying relative positions of the mobile body 100A and the mobile body 100B from the mobile body 100B that has observed the mobile body 100A, and the correcting unit 12D that corrects the self-position of the mobile body 100A based on the correction information 11H.

Consequently, the information processing apparatus 10A moves, based on the observation target information 11C indicating the probability of the mobile body 100A being observed from the mobile body 100B, the mobile body 100A to a position where the mobile body 100B is capable of observing the mobile body 100A. The information processing apparatus 10A can correct the self-position of the mobile body 100A based on the correction information 11H acquired from the mobile body 100B that has observed the mobile body 100A. As a result, the information processing apparatus 10A can correct a self-position in cooperation with the information processing apparatus 10 mounted on the mobile body 100B by moving the mobile body 100A to a position where the mobile body 100B is capable of observing the mobile body 100A.

The information processing apparatus 10B includes the estimating unit 12A that estimates a self-position of the mobile body 100B on which the own apparatus is mounted, the observing unit 12F that observes the mobile body 100A around the mobile body 100B, and the providing unit 12G that provides the correction information 11H capable of specifying relative positions of the observed mobile body 100A and the mobile body 100B to the information processing apparatus 10A of the mobile body 100A.

Consequently, when observing the mobile body 100A around the mobile body 100B, the information processing apparatus 10B can provide the correction information 11H capable of specifying relative positions of the observed mobile body 100A and the mobile body 100B to the information processing apparatus 10A of the mobile body 100A. As a result, the information processing apparatus 10B provides the correction information 11H to the information processing apparatus 10A of the observed mobile body 100A. Therefore, the information processing apparatuses 10 mounted on the plurality of mobile bodies 100 can support correction of the self-positions of the other mobile bodies 100 one another.

An information processing program is a program for realizing estimating a self-position of the mobile body 100A on which the own apparatus is mounted, performing control for moving, based on the observation target information 11C indicating a probability of the mobile body 100A being observed from the mobile body 100B, the mobile body 100A to a position where the mobile body 100B is capable of observing the mobile body 100A, acquiring the correction information 11H capable of specifying relative positions of the mobile body 100A and the mobile body 100B from the mobile body 100B that has observed the mobile body 100A, and correcting the self-position of the mobile body 100A based on the correction information 11H.

Consequently, the information processing program moves, based on the observation target information 11C indicating the probability of the mobile body 100A being observed from the mobile body 100B, the mobile body 100A to a position where the mobile body 100B is capable of observing the mobile body 100A. The information processing program can correct the self-position of the mobile body 100A based on the correction information 11H acquired from the mobile body 100B that has observed the mobile body 100A. As a result, the information processing program can correct the self-position in cooperation with the information processing apparatus 10 mounted on the mobile body 100B by moving the mobile body 100A to a position where the mobile body 100B is capable of observing the mobile body 100A.

The information processing program is a program for realizing estimating a self-position of the mobile body 100B on which the own apparatus is mounted, observing the mobile body 100A around the mobile body 100B, and providing the correction information 11H capable of specifying relative positions of the observed mobile body 100A and the mobile body 100B to the information processing apparatus 10A of the mobile body 100A.

Consequently, when observing the mobile body 100A around the mobile body 100B, the information processing program can provide the correction information 11H capable of specifying relative positions of the observed mobile body 100A and the mobile body 100B to the information processing apparatus 10A of the mobile body 100A. As a result, the information processing program provides the correction information 11H to the information processing apparatus 10A of the observed mobile body 100A. Therefore, the information processing apparatuses 10 mounted on the plurality of mobile bodies 100 can support correction of the self-positions of the other mobile body 100 one another.

Note that the following configurations also belong to the technical scope of the present disclosure.

(1)

An information processing system comprising:

a first information processing apparatus that estimates a self-position of a first mobile body; and a second information processing apparatus that estimates a self-position of a second mobile body, wherein the first information processing apparatus includes:

a movement control unit that performs control for moving, based on observation target information indicating a probability of the first mobile body being observed from the second mobile body, the first mobile body to a position where the second mobile body is capable of observing the first mobile body;

an acquiring unit that acquires correction information capable of specifying relative positions of the first mobile body and the second mobile body from the second mobile body that has observed the first mobile body; and a correcting unit that corrects the self-position of the first mobile body based on the correction information, and the second information processing apparatus includes:

an observing unit that observes the first mobile body around the second mobile body; and a providing unit that provides the correction information capable of specifying relative positions of the observed first mobile body and the second mobile body to the first information processing apparatus of the first mobile body.

(2)

The information processing system according to (1), wherein the first information processing apparatus further includes: a generating unit that generates, based on a movement plan of the second mobile body, the observation target information indicating a relation between a probability of the first mobile body being observed from the second mobile body and a position of the first mobile body, and the movement control unit performs control for moving, based on the generated observation target information, the first mobile body to the position where the second mobile body is capable of observing the first mobile body.

(3)

The information processing system according to (2), wherein the observation target information is information indicating information indicating a relation between the probability and the position in time series.

(4)

The information processing system according to (3), wherein the observation target information includes information indicating a probability of the first mobile body being observed from each of a plurality of the second mobile bodies.

(5)

The information processing system according to (4), wherein the movement control unit performs control for moving, based on a target position of the first mobile body and the observation target information, the first mobile body to the position where the second mobile body is capable of observing the first mobile body.

(6)

The information processing system according to (5), wherein the movement control unit does not perform, when it is determined that the self-position of the first mobile body is valid, control for moving the first mobile body to the position where the second mobile body is capable of observing the first mobile body, and performs, when it is determined that the self-position of the first mobile body is invalid, the control for moving the first mobile body to the position where the second mobile body is capable of observing the first mobile body.

(7)

The information processing system according to (1), wherein the second information processing apparatus further includes:

a second generating unit that generates observation information indicating a probability of observing the first mobile body around the second mobile body; and a second movement control unit that performs control for moving, based on the observation information, the second mobile body to a position where the second mobile body is capable of observing first mobile body.

(8)

The information processing system according to (7), wherein the observation information is information indicating a relation among the probability, the position, and a map in time series.

(9)

The information processing system according to (8), wherein the second movement control unit performs control for moving, based on a target position of the second mobile body and the observation information, the second mobile body to the position where the second mobile body is capable of observing the first mobile body.

(10)

The information processing system according to (9), wherein the second movement control unit performs, when an observation request from the first mobile body is acquired, control for moving the second mobile body to the position where the second mobile body is capable of observing the first mobile body, and does not perform, when the observation request from the first mobile body is not acquired, the control for moving the second mobile body to the position where the second mobile body is capable of observing the first mobile body.

(11)

An information processing apparatus comprising:

an estimating unit that estimates a self-position of a first mobile body on which an own apparatus is mounted;

a movement control unit that performs control for moving, based on observation target information indicating a probability of the first mobile body being observed from a second mobile body, the first mobile body to a position where the second mobile body is capable of observing the first mobile body;

an acquiring unit that acquires correction information capable of specifying relative positions of the first mobile body and the second mobile body from the second mobile body that has observed the first mobile body; and a correcting unit that corrects the self-position of the first mobile body based on the correction information.

(12)

An information processing apparatus comprising:

an estimating unit that estimates a self-position of a second mobile body on which an own apparatus is mounted;

an observing unit that observes a first mobile body around the second mobile body; and a providing unit that provides correction information capable of specifying relative positions of the observed first mobile body and the second mobile body to a first information processing apparatus of the first mobile body.

(13)

An information processing program for causing a computer to realize:

estimating a self-position of a first mobile body on which an own apparatus is mounted;

performing control for moving, based on observation target information indicating a probability of the first mobile body being observed from a second mobile body, the first mobile body to a position where the second mobile body is capable of observing the first mobile body;

acquiring correction information capable of specifying relative positions of the first mobile body and the second mobile body from the second mobile body that has observed the first mobile body; and correcting the self-position of the first mobile body based on the correction information.

(14)

An information processing program for causing a computer to realize:

estimating a self-position of a second mobile body on which an own apparatus is mounted;

observing a first mobile body around the second mobile body; and providing correction information capable of specifying relative positions of the observed first mobile body and the second mobile body to a first information processing apparatus of the first mobile body.

(15)

An information processing method comprising:

estimating, by a computer, a self-position of a first mobile body on which an own apparatus is mounted;

performing control, by the computer, for moving, based on observation target information indicating a probability of the first mobile body being observed from the second mobile body, the first mobile body to a position where the second mobile body is capable of observing the first mobile body;

acquiring, by the computer, correction information capable of specifying relative positions of the first mobile body and the second mobile body from the second mobile body that has observed the first mobile body; and correcting, by the computer, the self-position of the first mobile body based on the correction information.

(16)

An information processing method comprising:
estimating, by a computer, a self-position of a second mobile body on which an own apparatus is mounted;
observing, by the computer, a first mobile body around the second mobile body; and
providing, by the computer, correction information capable of specifying relative positions of the observed first mobile body and the second mobile body to a first information processing apparatus of the first mobile body.

REFERENCE SIGNS LIST

1 INFORMATION PROCESSING SYSTEM
10 INFORMATION PROCESSING APPARATUS
11 STORING UNIT
11A SELF-POSITION INFORMATION
11B DETERMINATION INFORMATION
11C OBSERVATION TARGET INFORMATION
11D OBSERVATION INFORMATION
11E PLAN INFORMATION
11F MOBILE BODY LIST INFORMATION
11G SENSOR MODEL INFORMATION
11H CORRECTION INFORMATION
12 CONTROL UNIT
12A ESTIMATING UNIT
12B MOVEMENT CONTROL UNIT
12C ACQUIRING UNIT
12D CORRECTING UNIT
12E FIRST GENERATING UNIT
12F OBSERVING UNIT
12G PROVIDING UNIT
12H SECOND GENERATING UNIT
100 MOBILE BODY
110 SENSOR UNIT
111 CAMERA
112 LiDAR
113 IMU
114 ODOMETRY
120 COMMUNICATION UNIT
130 DRIVING UNIT

The invention claimed is:
1. An information processing system, comprising:
a first information processing apparatus that includes a first central processing apparatus (CPU), wherein the first CPU is configured to estimate a self-position of a first mobile device; and
a second information processing apparatus that includes a second central processing apparatus (CPU), wherein
the second CPU is configured to estimate a self-position of a second mobile device,
the first CPU of the first information processing apparatus is further configured to:
control, based on observation target information, movement of the first mobile device to a position where the second mobile device is able to observe the first mobile device, wherein the observation target information indicates a probability of the first mobile device being observable from the second mobile device;
control acquisition of correction information that specifies relative positions of the first mobile device and the second mobile device from the second mobile device that has observed the first mobile device; and
control correction of the self-position of the first mobile device based on the correction information, and
the second CPU of the second information processing apparatus is further configured to:
execute control to observe the first mobile device around the second mobile device; and
provide the correction information that specifies the relative positions of the observed first mobile device and the second mobile device to the first information processing apparatus of the first mobile device.

2. The information processing system according to claim 1, wherein the first CPU of the first information processing apparatus is further configured to:
generate the observation target information based on a movement plan of the second mobile device, wherein the generated observation target information indicates a relation between:
the probability of the first mobile device being observable from the second mobile device, and
a position of the first mobile device; and
control, based on the generated observation target information, a movement of the first mobile device to the position where the second mobile device is able to observe the first mobile device.

3. The information processing system according to claim 2, wherein the observation target information indicates a relation between the probability and the position in time series.

4. The information processing system according to claim 3, wherein
the observation target information includes information that indicates a probability of the first mobile device being observable from each second mobile device of a plurality of second mobile devices, and
the plurality of second mobile devices includes the second mobile device.

5. The information processing system according to claim 4, wherein
the first CPU is further configured to control, based on a target position of the first mobile device and the observation target information, the first mobile device to the position where the second mobile device is able to observe the first mobile device.

6. The information processing system according to claim 5, wherein the CPU is further configured to:
not perform, in a case where the self-position of the first mobile device is valid, the control for the movement of the first mobile device to the position where the second mobile device is able to observe the first mobile device; and
control, in a case where the self-position of the first mobile device is invalid, the movement of the first mobile device to the position where the second mobile device is able to observe the first mobile device.

7. The information processing system according to claim 1, wherein the second CPU of the second information processing apparatus is further configured to:
generate observation information that indicates a probability of observation of the first mobile device around the second mobile device; and
based on the observation information, movement of the second mobile device to a position where the second mobile device is able to observe the first mobile device.

8. The information processing system according to claim 7, wherein the observation information that indicates a relation among the probability of the observation of the first mobile device around the second mobile device, the position where the second mobile device is moved, and a map in time series.

9. The information processing system according to claim 8, wherein the second CPU is further configured to control, based on a target position of the second mobile device and the observation information, the movement of the second mobile device to the position where the second mobile device is able to observe the first mobile device.

10. The information processing system according to claim 9, wherein the second CPU is further configured to:
control, in a case where an observation request from the first mobile device is acquired, the movement of the second mobile device to the position where the second mobile device is able to observe the first mobile device; and
not perform, in a case where the observation request from the first mobile device is not acquired, the control for the movement of the second mobile device to the position where the second mobile device is able to observe the first mobile device.

11. An information processing apparatus, comprising:
a central processing unit (CPU) is configured to:
estimate a self-position of a first mobile device on which an own apparatus is mountable;
control, based on observation target information, movement of the first mobile device to a position where a second mobile device is able to observe the first mobile device, wherein the observation target information indicates a probability of the first mobile device being observable from the second mobile device;
control acquisition of correction information that specifies relative positions of the first mobile device and the second mobile device from the second mobile device that has observed the first mobile device; and
control correction of the self-position of the first mobile device based on the correction information.

12. A second information processing apparatus, comprising:
a central processing unit (CPU) is configured to:
estimate a self-position of a second mobile device on which an own apparatus is mountable;
control, based on observation information, movement of the second mobile device to a position where the second mobile device is able to observe a first mobile device, wherein the observation information indicates a probability of observation of the first mobile device around the second mobile device;
control, based on the movement of the second mobile device, observation of the first mobile device around the second mobile device; and
provide correction information that specifies relative positions of the observed first mobile device and the second mobile device to a first information processing apparatus of the first mobile device.

13. A non-transitory computer-readable medium having stored thereon computer-executable instructions that, when executed by a computer, cause the computer to execute operations, the operations comprising:
estimating a self-position of a first mobile device on which an own apparatus is mountable;
controlling, based on observation target information that indicates a probability of the first mobile device being observable from a second mobile device, movement of the first mobile device to a position where the second mobile device the first mobile device;
controlling acquisition of correction information capable of specifying relative positions of the first mobile device and the second mobile device from the second mobile device that has observed the first mobile device; and
controlling correction of the self-position of the first mobile device based on the correction information.

14. A non-transitory computer-readable medium having stored thereon computer-executable instructions that, when executed by a computer, cause the computer to execute operations, the operations comprising:
estimating a self-position of a second mobile device on which an own apparatus is mountable;
controlling, based on observation information, movement of the second mobile device to a position where the second mobile device is able to observe a first mobile device, wherein the observation information indicates a probability of observation of the first mobile device around the second mobile device;
controlling, based on the movement of the second mobile device, observation of the first mobile device around the second mobile device; and
providing correction information capable of specifying relative positions of the observed first mobile device and the second mobile device to an information processing apparatus of the first mobile device.

* * * * *